United States Patent
Kim et al.

(10) Patent No.: US 12,253,247 B2
(45) Date of Patent: Mar. 18, 2025

(54) HOME APPLIANCE AND CONTROL METHOD THEREFOR

(71) Applicant: LG ELECTRONICS INC., Seoul (KR)

(72) Inventors: Jeongkil Kim, Seoul (KR); Wanglim Lee, Seoul (KR); Seongho Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/780,822

(22) Filed: Jul. 23, 2024

(65) Prior Publication Data
US 2024/0377053 A1 Nov. 14, 2024

Related U.S. Application Data

(63) Continuation of application No. 17/787,164, filed as application No. PCT/KR2020/000702 on Jan. 14, 2020, now Pat. No. 12,078,332.

(30) Foreign Application Priority Data

Dec. 19, 2019 (KR) .................. 10-2019-0171278
Jan. 7, 2020 (KR) .................. 10-2020-0002284

(51) Int. Cl.
| | |
|---|---|
| *F21V 23/04* | (2006.01) |
| *A47L 15/00* | (2006.01) |
| *A47L 15/42* | (2006.01) |
| *A47L 15/46* | (2006.01) |
| *D06F 33/43* | (2020.01) |

(Continued)

(52) U.S. Cl.
CPC ....... *F21V 23/0485* (2013.01); *A47L 15/0057* (2013.01); *A47L 15/4257* (2013.01); *A47L 15/46* (2013.01); *A47L 2301/08* (2013.01); *A47L 2501/36* (2013.01); *D06F 33/43* (2020.02); *D06F 34/14* (2020.02); *D06F 39/14* (2013.01); *D06F 2101/00* (2020.02); *D06F 2105/00* (2020.02); *F24C 15/008* (2013.01); *F24C 15/04* (2013.01); *F25D 23/02* (2013.01); *F25D 27/005* (2013.01); *G01P 15/18* (2013.01)

(58) Field of Classification Search
CPC .................................................. F21V 23/0485
USPC .......................................................... 362/125
See application file for complete search history.

(56) References Cited

U.S. PATENT DOCUMENTS

| | | | |
|---|---|---|---|
| 2006/0213898 A1* | 9/2006 | Beaudoin | F24C 15/022 219/413 |
| 2017/0191745 A1* | 7/2017 | Choi | B29C 44/18 |

(Continued)

*Primary Examiner* — Christopher M Raabe
(74) *Attorney, Agent, or Firm* — Fish & Richardson P.C.

(57) ABSTRACT

Proposed is a home appliance that includes a reception space configured to receive objects therein; a heater configured to heat the reception space; a door configured to open/close an open surface of the reception space, the door having a viewing window provided at the door; a lamp configured to illuminate an inside of the reception space; a sensor assembly configured to output a knock-on signal based on detecting a user's knock; and a controller configured to turn on/off the lamp based on the knock-on signal output by the sensor assembly, wherein based on a present state of the home appliance corresponding to at least any one of a plurality of preset exceptional situations, the controller is configured to not turn on/off the lamp regardless of the knock-on signal being output.

16 Claims, 24 Drawing Sheets

(51) Int. Cl.
      *D06F 34/14*     (2020.01)
      *D06F 39/14*     (2006.01)
      *D06F 101/00*    (2020.01)
      *D06F 105/00*    (2020.01)
      *F24C 15/00*     (2006.01)
      *F24C 15/04*     (2006.01)
      *F25D 23/02*     (2006.01)
      *F25D 27/00*     (2006.01)
      *G01P 15/18*     (2013.01)

(56) References Cited

U.S. PATENT DOCUMENTS

| | | | |
|---|---|---|---|
| 2017/0268924 A1* | 9/2017 | Shin | G01V 8/10 |
| 2018/0156535 A1* | 6/2018 | Kim | H04R 1/028 |
| 2019/0107290 A1* | 4/2019 | Signorino | F24C 15/008 |
| 2022/0186934 A1* | 6/2022 | Cowan | F24C 7/082 |
| 2023/0015953 A1* | 1/2023 | Kim | G01P 15/18 |
| 2023/0050130 A1* | 2/2023 | Shin | F24C 15/02 |
| 2023/0053034 A1* | 2/2023 | Shin | F24C 3/128 |
| 2023/0067958 A1* | 3/2023 | Lee | F24C 7/085 |

* cited by examiner

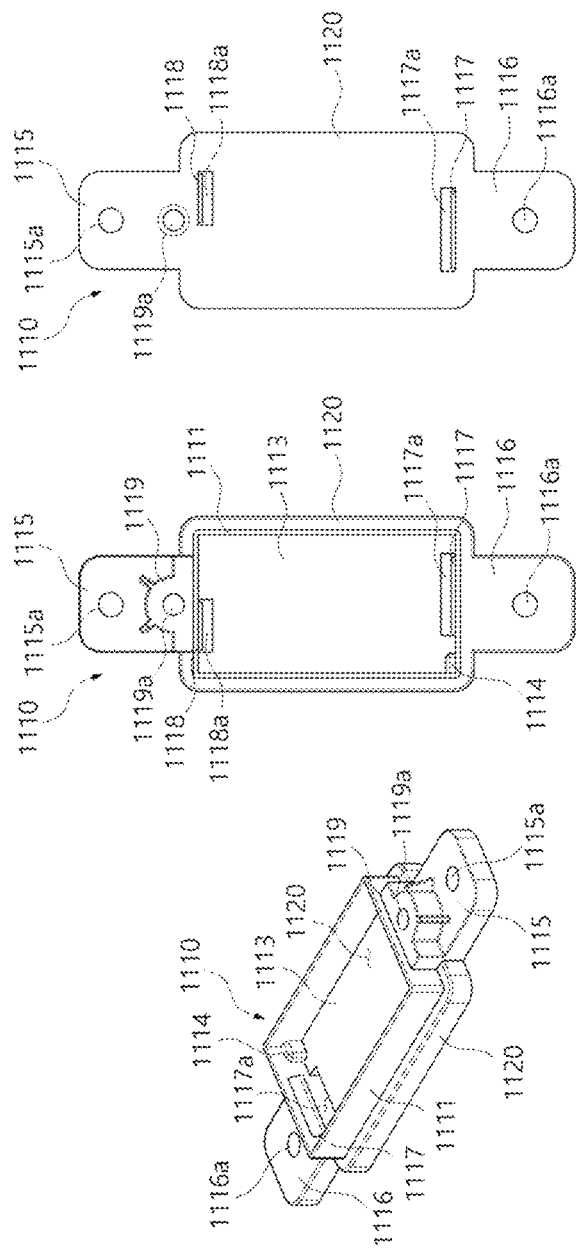

HOME APPLIANCE AND CONTROL METHOD THEREFOR

CROSS-REFERENCE TO RELATED APPLICATIONS

The present application is a continuation of U.S. application Ser. No. 17/787,164, filed on Jun. 17, 2022, which is a National Stage application under 35 U.S.C. 371 of International Patent Application No. PCT/KR2020/000702, filed on Jan. 14, 2020, which claims priority to Korean Patent Application No. 10-2019-0171278, filed on Dec. 19, 2019, and Korean Patent Application No. 10-2020-0002284, filed on Jan. 7, 2020, the disclosures of which are hereby incorporated by reference in their entirety.

TECHNICAL FIELD

The present disclosure relates generally to a home appliance. More particularly, the present disclosure relates to a home appliance and a control method therefor in which a viewing window is installed such that the inner space of the home appliance can be seen from the outside.

BACKGROUND

Home appliances that are provided with a door and configured to receive objects in an internal space thereof are widely used. In some examples, these home appliances can include cooking equipment, a refrigerator, and a clothing processing device.

In some cases, each of these home appliances may be provided with a reception space for receiving objects in a cabinet constituting an exterior, and a door for opening/closing the reception space. In some examples, two or more doors may be provided as needed.

In some examples, the door of a home appliance can be opaque, so in order to see any of the objects that are accommodated in the reception space, it may be necessary to open the door of the home appliance because the objects cannot be seen from the outside.

In the case of a home appliance such as a refrigerator or an oven, when a door is opened to see the inside thereof, cold air or heat inside leaks to the outside, which may cause unnecessary energy loss.

In some examples, a home appliance such as an oven, a washing machine, and a drying machine can have a viewing window mounted to the door of the home appliance such that an object inside can be viewed through the viewing window, but the object cannot be properly checked at night or in a dark environment.

In some examples, a home appliance can include a lamp that can be turned on and illuminate the inside of the reception space with a knocking motion of a user lightly tapping the door of the home appliance without opening the door.

In some examples, when a sensor detects a sound wave generated by a knock input applied to a door, a lamp can operate. Furthermore, in another example, a sensor can include a microphone part, wherein the microphone part protrudes toward an external glass to be disposed to face the external glass, and receives a knock input as a sound wave through the external glass.

However, in some cases, in order for a sound wave generated by a knock to reach the sensor, a single medium is required to be provided between a knock position and a sensor position so as to maintain the continuity of the medium for transmitting the sound wave to the sensor, so the installation position of the sensor can be very limited. Additionally, in the case of a home appliance such as an oven, when a sensor is attached to the door of the home appliance, high-temperature heat can be transmitted to the door, so the sensor can malfunction due to the high-temperature heat.

For example, in a refrigerator, in addition to a vibration due to a knock, various vibrations such as a vibration of the refrigerator or a vibration generated by other external forces may occur, but the home appliances cannot distinguish the vibration generated by the knock from these other vibrations, so a situation in which a knock is erroneously detected may occur. In some cases, the continuity of a medium is maintained between a position to which a knock can be applied and the installation position of a sound wave sensor.

In some examples, when the continuity of a medium is not maintained, the attenuation width of a sound wave transmitted through heterogeneous media can be relatively large, so the intensity of the sound wave generated by an impact applied to other parts of a refrigerator other than a front panel can be sufficiently attenuated.

In some examples, when detecting a knock input by distinguishing a sound wave generated by a knock applied to the front panel from other sound waves by using the attenuation width of the sound wave, the malfunction of the sensor generated by impacts or vibrations applied to parts other than the front panel can be significantly reduced. In some cases, a knock input is detected by using the attenuation width of the sound wave signal, so vibration which does not occur in the front panel is not recognized as a knock.

In some examples, the sound wave sensor can be required to be attached to the front panel, wherein the installation position of the sensor can be limited, and the sound wave sensor can be used to distinguish a knock signal generated on the front panel from vibration generated by other causes, but the use of such a sound wave sensor may have difficulties.

In some cases, since the sensor is configured to detect a sound wave, the sensor can detects a knock input by considering only the intensity and pattern of the sound wave generated by the knock, therefore sound waves generated by factors other than a knock can be erroneously recognized as the knock.

In some cases, sound wave detection cannot consider the direction of a location at which a sound wave is generated, so it is difficult to determine the location at which the sound wave is generated. For example, it can be difficult to distinguish a sound wave generated by a knock on the door from a sound wave generated by other factors at a location other than the door. Therefore, there is a problem in that even when a sound wave having a pattern and intensity similar to the sound wave of knock is received, the sound wave is erroneously detected as a knock.

In some examples, in the case of a home appliance having a high temperature therein, such as an oven, a sensor may malfunction due to heat transmitted to a viewing window, so it can be difficult to install the sensor on the viewing window, and when a sensor is installed at a location other than the viewing window, the performance of the sensor which detects a knock input can be deteriorated.

In some cases, a sensor that detects sound waves can be installed on the door by being pressed thereon, but there may be a problem in that the detection rate of the sensor varies depending on the degree of the pressing. For example, when the sensor is forcibly pressed, the detection rate of the sensor can be decreased, and when the sensor is lightly pressed, the sensor can react to a surrounding sound wave, such as the sound wave of a motor.

In some examples, in the conventional home appliance, when a vibration sensor is used for knock detection, it can be difficult to filter noise vibration other than a knock, so a sound wave sensor may be installed. For example, when it is difficult to attach the sensor to a door due to high heat, such as in the oven, the sensor may be required to be installed at another location, but in this case, the attenuation of sound wave transmission increases, so it can be difficult for the sensor to perform precise detection of a sound wave and to filter noise signals.

In some examples, in the case of a home appliance, advanced functions for convenience are continuously being added, and manipulating devices for multifunctionality by which many additional functions can be manipulated are being added to the door. In some cases, since the design and manufacture of the door become more complicated, devices or elements for newly added functions can be installed in parts other than the door.

For example, although the size of a viewing window and a display mounted on the door continues to increase, it can be difficult to provide an additional space to the door for additionally arranging devices such as sensors, elements, and modules for advanced functions on the door. Therefore, the need to attach the associated devices to a location other than the door is emerging.

SUMMARY

According to one aspect of the subject matter described in this application, a home appliance can include: a cabinet defining an exterior of the home appliance; a reception space defined inside the cabinet and configured to receive objects in the reception space; a door configured to open/close an open surface of the reception space, the door having a viewing window provided at the door; a lamp configured to illuminate an inside of the reception space; a sensor assembly configured to output a knock-on signal based on detecting a user's knock; and a controller configured to turn on/off the lamp based on the knock-on signal output by the sensor assembly, wherein based on a present state of the home appliance corresponding to at least any one of a plurality of preset exceptional situations, the controller is configured to not turn on/off the lamp regardless of the knock-on signal being output.

Implementations according to this aspect can include one or more of the following features. For example, based on the door of the home appliance being opened, the controller can be configured to not turn on/off the lamp regardless of the knock-on signal being output.

In some implementations, based on the home appliance being in a self-clean operation, the controller can be configured to not turn on/off the lamp regardless of the knock-on signal being output.

In some implementations, based on the door of the home appliance being locked, the controller can be configured to not turn on/off the lamp regardless of the knock-on signal being output.

In some implementations, based on the lamp being turned on by a user touching a lamp button, the controller can be configured to not turn on/off the lamp regardless of the knock-on signal being output.

In some implementations, based on a knock-on function being preset to be turned off by a user touching a knock-on button, the controller can be configured to not turn on/off the lamp regardless of the knock-on signal being output.

In some implementations, based on the lamp blinking after pre-heating of the home appliance is completed, the controller can be configured to not turn on/off the lamp regardless of the knock-on signal being output.

In some implementations, the controller can be configured to determine whether the door is locked through a door lock switch.

In some implementations, the door lock switch can be configured to transmit information on whether the door is locked to the controller and lock/unlock the door according to a control signal output from the controller.

According to another aspect, a home appliance can include a cabinet defining an exterior of the home appliance; a reception space defined inside the cabinet and configured to receive objects in the reception space; a door configured to open/close an open surface of the reception space, the door having a viewing window provided at the door; a lamp configured to illuminate an inside of the reception space; a sensor assembly configured to output a knock-on signal based on detecting a user's knock; a display part disposed at an outer surface of the cabinet and configured to display a plurality of buttons; and a controller configured to turn on/off the lamp based on a touch signal of each of the buttons and the knock-on signal output by the sensor assembly, wherein based on at least one of the plurality of buttons displayed on the display part being touched, the controller is configured to not turn on/off the lamp regardless of the knock-on signal being output.

Implementations according to this aspect can include one or more of the following features. For example, a knock-on button configured to turn on/off a knock-on function based on a user's touch can be displayed on the display part, and based on the knock-on button being touched and the knock-on function being preset to be turned off, the controller can be configured to not turn on/off the lamp regardless of the knock-on signal being output.

In some implementations, a lamp button configured to turn on/off the lamp based on a user's touch can be displayed on the display part, and based on the lamp button being touched and the lamp being turned on, the controller can be configured to not turn on/off the lamp regardless of the knock-on signal being output.

According to another aspect, a control method for a home appliance can include outputting a knock-on signal based on a vibration generated by a user's knock applied to the home appliance being detected, and determining whether a present state of the home appliance corresponds to at least one of a plurality of preset exceptional situations based on the knock-on signal being output, wherein based on the present state of the home appliance not corresponding to at least one of the preset exceptional situations, a lamp installed inside a reception space of the home appliance is turned on/off, but based on the present state of the home appliance corresponding to at least one of the preset exceptional situations, the lamp is not turned on/off regardless of the knock-on signal being output.

Implementations according to this aspect can include one or more of the following features. For example, the preset exceptional situations can include at least one of a state in which a door of the home appliance is opened, a state in which the home appliance is in a self-clean operation, a state in which the door of the home appliance is locked, a state in which the lamp is turned on by a user touching a lamp button, a state in which the knock-on function is preset to be turned off by a user touching a knock-on button, and a state in which the lamp is blinking after pre-heating of the home appliance is completed.

According to another aspect, a control method for a home appliance can include outputting a knock-on signal based on a vibration generated by a user's knock applied to the home appliance being detected; determining whether a knock-on function is preset to be turned on by touching a knock-on button based on the knock-on signal being output; determining whether the home appliance is in a self-clean operation based on the knock-on function being preset to be turned on; determining whether a door of the home appliance is locked based on the home appliance not being in the self-clean operation; determining whether the door is closed based on the door not being locked; and determining whether to turn on/off a lamp installed inside a reception space of the home appliance based on the door being closed.

Implementations according to this aspect can include one or more of the following features. For example, in the determining of whether to turn on/off the lamp, based on the lamp being in a turned-on state, the lamp can be turned off, but based on the lamp being in a turned-off state, the lamp can be turned on.

In some implementations, based on it being determined that the home appliance is in at least one of a state in which the knock-on function is preset to be turned off, a state in which the home appliance is in the self-clean operation, a state in which the door is locked, and a state in which the door is opened, the knock-on signal is ignored and the lamp is not turned on/off.

In some implementations, the method can further include determining whether the lamp is turned on by a user touching a lamp button before the determining of whether to turn on/off the lamp, wherein in the determining of whether to turn on/off the lamp, based on the lamp being turned on by the lamp button touched by a user, the lamp is not turned on/off.

BRIEF DESCRIPTION OF THE DRAWINGS

FIGS. 21A to 24 are views illustrating an example of the configuration of the sensor assembly.

DETAILED DESCRIPTION

Figure 1:
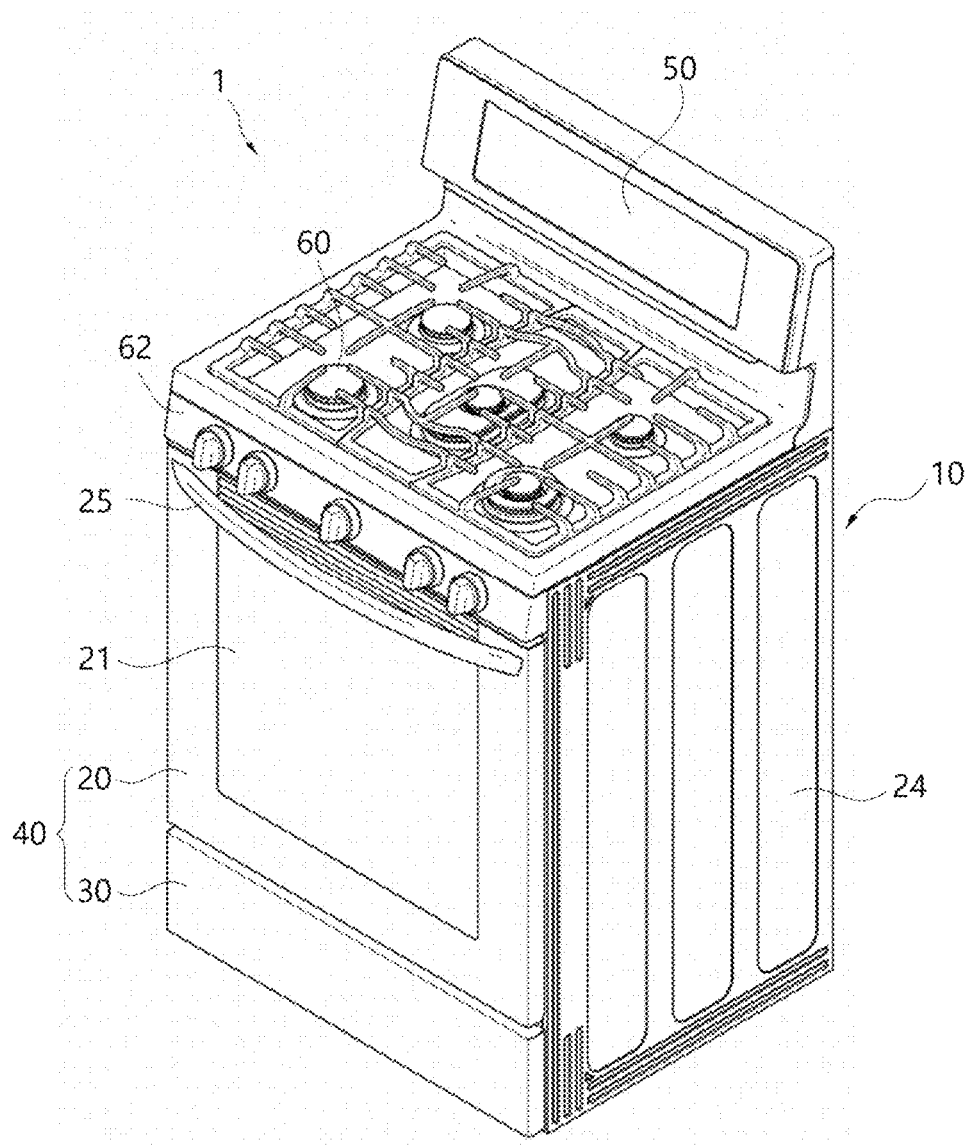
FIG. 1 is a view illustrating an example state of the exterior of a home appliance.
Figure 2:
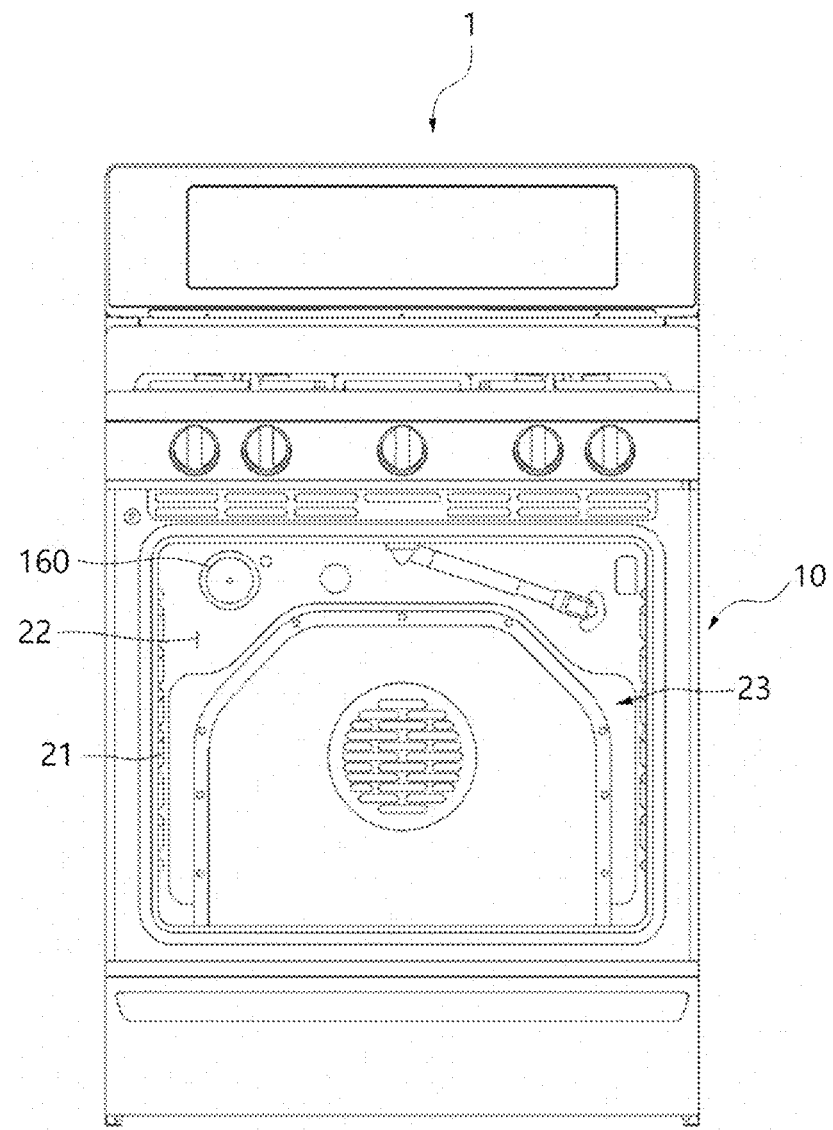
FIG. 2 is a sectional view illustrating an example state of the home appliance.

As described above, in a conventional home appliance, a vibration sensor can be used for knock detection, but since it is difficult to distinguish vibrations generated by factors other than a knock from vibrations generated by the knock and difficult to filter the vibrations generated by other factors, a sound wave sensor can be installed in the conventional home appliance. Furthermore, in the case of an oven in which it is difficult to attach the sound wave sensor to the door of the oven due to high heat, the sensor can be required to be installed in another position, but in this case, the attenuation of sound wave transmission can be increased, so it can be difficult for the sensor to perform the precise detection of a sound wave and to filter noise signals. In some implementation, the present disclosure will describe a home appliance in which the installation position of a sensor is not limited and the vibration detection signals of three axial directions are used such that vibration generated by a knock can be precisely determined.

In some implementations, the present disclosure will describe a home appliance which allows a user to check the inner space of the home appliance through a viewing window without opening a door.

In some implementations, the present disclosure will describe a home appliance in which when a knock input performed by a user is detected, a lamp operates to illuminate the inner space of the home appliance.

In some implementations, the present disclosure will describe a home appliance which can accurately detect a knock input even if the knock input is small.

In some implementations, the present disclosure will describe a home appliance which can accurately detect whether a knock input is performed by determining the directionality of vibration corresponding to the knock input.

In some implementations, the present disclosure will describe a home appliance which a sensor for detecting a knock input is not limited to be located on a door but may be located at various positions.

In some implementations, the present disclosure will describe a home appliance in which each of the vibrations of three axial directions is detected and vibration signals corresponding to the vibrations of the three axial directions are compared with each other so as to clearly distinguish vibrations generated by a knock from vibrations generated by other factors such that detection of a knock input is improved.

In some implementations, the present disclosure will describe a home appliance in which any one axial direction of three axial directions coincides with the direction of a vibration generated by a knock so as to accurately detect a vibration signal corresponding to the vibration generated by the knock.

In some implementations, the present disclosure will describe a home appliance which in a case in which any one axial direction of three axial directions does not coincide with the direction of a vibration generated by a knock, has the function of correcting this automatically.

In some implementations, the present disclosure will describe a home appliance which has the function of automatically correcting the detection error of a sensor, which detects a vibration generated by a knock, such that the sensor is prevented from being influenced by the temperature.

In some implementations, the present disclosure will describe a home appliance in which a sensor assembly which detects a vibration generated by a knock is installed on a door handle mounted to a door so as to increase the accuracy of vibration detection.

In some implementations, the present disclosure will describe a home appliance in which a sensor which detects a knock input is installed at a position which is not affected by heat such that the detection performance of the sensor for a knock input can be prevented from deteriorating due to heat.

In some implementations, the present disclosure will describe a home appliance in which the sensor assembly configured in a form of a module is applied so as to minimize a structure change by the installation of the sensor assembly and to precisely analyze a vibration generated by a knock.

In some implementations, the present disclosure will describe a home appliance in which the turning on/off of a lamp can be controlled according to a user's knock.

In some implementations, the present disclosure will describe a home appliance in which in a specific exceptional situation such as a state in which a lamp is already turned on or a knock-on function is turned off by touching a lamp button, the lamp is not turned on/off even if a user's knock is detected.

In some implementations, the present disclosure will describe a home appliance in which when a door is opened or a self-clean function is being performed, a lamp is not turned on/off even if a user's knock is detected.

The implementations of the present disclosure are not limited to the implementations mentioned above, and other implementations that are not mentioned will be clearly understood by those skilled in the art.

A home appliance according to the implementation of the present disclosure can include: a reception space defined in a cabinet constituting the exterior of the home appliance and configured to receive objects, and a door configured to open/close the front part of the reception space, wherein a viewing window can be mounted to a portion of the door such that a user can see the inside of the reception space from the outside through the viewing window.

In some implementations, according to the defined position of the reception space and lighting around the home appliance, it can be difficult to see the inside of the reception space through the viewing window.

Accordingly, in some cases, a lamp may be installed in the reception space to illuminate the inside of the reception space, or may be installed outside of the reception space to emit light toward and illuminate the inside of the reception space such that the inside of the reception space can be clearly seen.

In some implementations, the operation of such a lamp may be performed by a user's simple manipulation.

For example, when a user knocks on the door, preferably, on the viewing window, a sensor assembly provided inside the home appliance may detect vibration generated by a knock, and a controller may control the turning on/off of the lamp on the basis of a knock-on signal received from the sensor assembly.

In some cases, when a user simply knocks on the door or the viewing window, a vibration generated by the knock may be detected, and the lamp may illuminate the reception space. In some cases, the user may clearly see the inside of the reception space by a simple motion.

In some implementations, the sensor assembly may be installed on the door or a position away from the door and may detect vibration generated by a knock applied to a portion of the door and transmitted through a same medium or media different from each other. In some cases, the range of the installation position of the sensor assembly may increase.

In some implementations, the controller may turn on/off the lamp when the sensor assembly detects a vibration generated by a knock.

In some implementations, when the sensor assembly detects a vibration generated by a knock in the turned-off state of the lamp, the controller may turn on the lamp, and may turn off the lamp when the sensor assembly detects a vibration generated by a knock in the turned-on state of the lamp. In some cases, a user may turn on/off the lamp by just knocking.

In some implementations, the controller may automatically turn off the lamp when a predetermined period of time elapses after the lamp is turned on. In some cases, when the lamp is turned on, even if a user forgets to turn off the lamp, the lamp may be automatically turned off after a predetermined period of time such that unnecessary power consumption can be prevented.

In some implementations, the door may be installed on the front part of the cabinet, and the sensor assembly may be installed on the rear or lower portion of the cabinet. For example, the sensor assembly may be installed on the rear portion of the lower portion of the cabinet.

In another implementations, the sensor assembly may be installed on a handle part provided on a side of the door. When the sensor assembly is installed on the handle part, the sensor assembly may be installed at a position close to the door, so the vibration detection performance of the sensor assembly can be improved and the accuracy of the detection of the sensor assembly may increase.

In some cases, parts on which the door and the sensor assembly are installed may be made of the same medium or different media. When the parts are made of different media, a vibration applied to the door by a knock may be transmitted to the sensor assembly through a plurality of different media physically connected to each other.

In some implementations, the installation position of the sensor assembly may be important. For example, if the home appliance is an oven, the oven cooks food by high heat, and thus when the sensor assembly is installed on the viewing window of the door, the vibration detection performance of the sensor assembly may deteriorate due to high heat. In some cases, the sensor assembly is preferably installed at a position away from the door.

In some cases, in order for the sensor assembly to detect a vibration applied to the door, a plurality of parts constituting the home appliance may be physically connected to each other such that these solid parts function as media for transmitting the vibration.

In some cases, a vibration applied to the door by a knock may be transmitted to the sensor assembly through the plurality of media. Accordingly, it can be possible to prevent deterioration of the detection performance of the sensor assembly due to high heat.

In some implementations, a sensor assembly may detect a vibration detection signal corresponding to a vibration, and may determine whether or not a knock is input according to the vibration detection signal. In some cases, when a vibration detection signal of a preset threshold or more is continuously detected at a regular time interval, it may be determined that a knock is applied.

In some cases, a knock generates "knocking sounds" at regular time intervals. In some cases, it may be determined that the vibrations are generated by a knock when the vibration detection signals correspond to the knocking sounds at regular time intervals. In some cases, determining whether the vibration is generated by the knock may be easily performed.

In some implementations, a vibration generated by a knock may be generated only in a first axial direction among three axial directions. For example, a vibration generated by a knock may be generated only in any one axis of x, y, and z axes. Therefore, determining whether the vibration is generated by a knock may be performed by detecting the vibration detection signal of a first-axis of three axes.

In some implementations, the sensor assembly may compare patterns of vibration detection signals with a preset pattern of a vibration detection signal corresponding to a vibration generated by a knock and may determine whether the vibration is generated by a knock.

In some implementations, the pattern of the vibration detection signal generated by a knock may be preset, and whether the pattern corresponds to a basic pattern can be determined so as to determine whether a knock occurs.

In some implementations, the sensor assembly may detect vibrations transmitted in all directions. In some cases, the sensor assembly may include a vibration sensor having a plurality of axes. For example, vibrations transmitted in a plurality of axial directions can be detected by using such a vibration sensor.

In some implementations, vibrations transmitted in three axial directions may be detected, and vibration detection signals corresponding to the vibrations of the three axial directions may be combined with each other so as to detect a vibration corresponding to a knock.

In some cases, the number of vibration sensors is increased to detect vibrations transmitted in three or more directions such that the reliability of detection of a vibration generated by a knock can be increased.

In some implementations, for example, the home appliance may include: a 3-axis sensor module which detects vibrations transmitted in three axial directions and generates vibration detection signals corresponding to the vibrations transmitted in the three axial directions, and a sensor microcomputer determining whether the vibration is generated by a knock based on the vibration detection signals generated by the 3-axis sensor module.

In some implementations, the sensor assembly installed at a position other than the door may use a vibration sensor having a plurality of axes to determine whether a vibration is generated by a knock applied to the door or by a knock or motion applied to another position. In some cases, the sensor assembly may use three axes. In some cases, the sensor assembly may use three axes or more for a more precise control, but may distinguish vibrations of all directions with three axes. For example, even if a knock is input from any part of the home appliance, the sensor assembly may detect vibration generated by the knock.

In some implementations, one axis of three axes may be preset as the direction of vibration generated by a knock, and the direction of the vibration generated by the knock and directions of vibrations of the two remaining axes may be compared with each other so as to determine whether the knock signal is generated at the door. In some cases, the vibrations of the three axial directions may be detected and be combined with each other so as to detect the vibrations of all directions of three dimensions. In some cases, the 3-axis sensor module detects the vibrations of all directions of three dimensions.

In some implementations, a first, a second, and a third-axis sensor may be used independently of each other or in combination with each other so as to detect a vibration by a knock. In some cases, each of the first, second, and third sensors may include multiple sensors provided at multiple positions, and vibration detection signals detected by the multiple sensors may be compared with each other so as to detect the direction and position of a knock.

In some implementations, the sensor assembly may further include a filter part which removes noise included in the vibration detection signals generated by the 3-axis sensor module, and an amplifying part which amplifies vibration detection signals output by the filter part and outputs the amplified vibration detection signals to the sensor microcomputer.

In some implementations, the 3-axis sensor module may include three acceleration sensors, wherein the three acceleration sensors may include a first acceleration sensor which detects a vibration of a first axial direction of the three axial directions, a second acceleration sensor which detects a vibration of a second axial direction thereof, and a third acceleration sensor which detects a vibration of a third axial direction thereof.

In some cases, an acceleration sensor of the three acceleration sensors may be installed such that an axial direction of the one acceleration sensor for detecting a vibration coincides with the direction of vibration generated by a knock. In some cases, the direction of the vibration generated by the knock may be in alignment with the direction of one axis of three axes so as to increase the accuracy of the detection of the vibration generated by a knock.

In some implementations, the 3-axis sensor module may include one 3-axis acceleration sensor which simultaneously detects vibrations of three axial directions. In some cases, the 3-axis acceleration sensor may be installed such that one axial direction of the three axial directions coincides with the direction of a vibration generated by a knock.

In some implementations, a sensor microcomputer may compare the patterns of vibration detection signals generated by the 3-axis sensor module with the pattern of a vibration detection signal corresponding to a vibration generated by a knock to determine whether the vibration is generated by the knock.

In some implementations, the 3-axis sensor module and the sensor microcomputer may be mounted on one PCB, and accordingly, the sensor assembly may be configured as an integrated module. In some cases, even when the filter part and the amplifying part are added to the 3-axis sensor module and the sensor microcomputer, the 3-axis sensor module, the sensor microcomputer, the filter part, and the amplifying part may be mounted on the PCB, so the sensor assembly may be configured as an integrated module. In some cases, the sensor assembly may be configured in the form of a PCB module and thus may be easily installed on and attached to the home appliance, and may easily be installed even on an existing home appliance. Furthermore, the range of the installation position of the sensor assembly may increase.

In some implementations, the sensor microcomputer may extract vibration detection signals of a preset first direction among vibration detection signals of three axial directions and may use the extracted vibration detection signals of the first direction so as to determine whether a vibration is generated by a knock. In some cases, the vibration generated by the knock is generated in any first direction.

In some cases, the sensor microcomputer may determine that there is a vibration generated by a knock when each of the vibration detection signals of the first direction is equal to a preset first threshold or more and, after a predetermined period of time, is equal to a preset second threshold or more. In some cases, when a knock is applied with "knocking sounds", vibrations corresponding to the "the knocking sounds" generate signals of predetermined sizes or more and vibrations generated by other factors generate signals of smaller sizes. For example, when the vibration detection signals corresponding to the "the knocking sounds" are equal to or greater than the first and second thresholds, it may be determined that the vibration is generated by the knock.

In some implementations, when the size of a vibration detection signal generated by a 1st knock is greater than or equal to the preset first threshold, and after a preset period of time, when the size of a vibration detection signal generated by a 2nd knock is greater than or equal to the preset second threshold, the sensor microcomputer may determine that the vibration is generated by the knock.

In some implementations, the sensor microcomputer may extract a vibration detection signal of any one axial direction (e.g., a first axial direction) which coincides with the direction of a vibration generated by the knock among vibration detection signals of three axial directions, and may compare the extracted vibration detection signal of the first axial direction with the vibration detection signals of two other axial directions (e.g., second and third axial directions) so as to determine whether the vibration is generated by the knock.

In some cases, when the maximum value of a vibration detection signal of at least one axial direction of the second and third axial directions is greater than the maximum value of the vibration detection signal of the first axial direction, the sensor microcomputer may determine that there is no vibration generated by the knock.

In some implementations, the lamp of the home appliance may be installed outside the reception space and may emit light toward the inside of the reception space or may be installed inside the reception space and may illuminate the inside of the reception space. In some cases, the inside of the reception space has a very high temperature and thus is required to be embodied with a material having high durability against high temperature heat.

In some implementations, by checking some exceptional situations corresponding to specific conditions, the lamp may not be turned on even if a user's knock is detected. In some cases, this can be intended to preset some exceptional situations in which the lamp is required to be prevented from being turned on despite a knock input for safety, energy saving, or a user's convenience.

In some cases, such exceptional situations may include an opened state of the door, a state in which a self-clean operation is underway, a state in which a door is preset to be locked for a predetermined period of time after the self-clean operation, a state in which the lamp is already turned on by touching the lamp button, a turned-off state of a knock-on function, and a state in which the lamp is blinking after the home appliance is warmed up. In such exceptional situations, the lamp may not be turned on/off despite a user's knock.

In some implementations, the home appliance may be provided with a lamp on/off switch, so the turning on/off of the lamp may be controlled by a user's manipulative input.

In some implementations, instead of a conventional sensor which does not consider the direction of a vibration or sound wave generated by a knock, the 3-axis sensor module which detects vibrations of all directions of three dimensions may be used to distinguish a vibration generated by a knock from vibrations generated by other factors such that the accuracy and reliability of detection of the vibration generated by a knock can be secured.

In some implementations, the inside of the reception space may be seen through the viewing window without opening a door configured to open/close the reception space in which objects are received.

In some implementations, when a user knocks on the home appliance, the user's knock may be detected and the lamp installed in the reception space may illuminate the inside of the reception space such that the user can see the inside of the reception space from the outside through the viewing window.

In some implementations, vibration transmitted through solid media constituting the home appliance may be detected, thereby accurately detecting even a slight knock.

In some implementations, the directionality of a vibration generated by a user's knock input may be considered, and thus the direction of the vibration generated by the knock and the directions of vibrations generated by other factors can be distinguished from each other, thereby accurately detecting whether the vibration is generated by the knock.

In some implementations, the sensor for detecting a vibration generated by a knock input may not be limited to be located on the door, but may be installed at various positions, thereby increasing the range of the installation position of the sensor without restriction on the installation position thereof.

In some implementations, the vibrations of a plurality of axial directions may be detected independently of each other, and vibration signals corresponding to the vibrations of the plurality of axial directions may be compared with each other to be analyzed so as to clearly distinguish vibration generated by a knock from vibrations generated by other factors, thereby providing a high detection performance for a knock input.

In some implementations, a sensor which detects the vibrations of a plurality of axial directions may match one axial direction of the plurality of axial directions with the direction of a vibration generated by a knock, thereby accurately detecting a vibration signal corresponding to the vibration generated by the knock.

In some implementations, when any one axial direction of a sensor which detects vibration among a plurality of axial directions does not coincide with the direction of vibration generated by a knock, this may be automatically corrected, thereby improving the accuracy of knock detection.

In some implementations, vibrations generated in the axial directions of three dimensions may be detected and, among the vibrations of these three-dimensional axial directions, the direction of a vibration generated by a knock may be distinguished from the directions of vibrations generated by other factors, thereby improving the accuracy of knock detection.

In some implementations, due to a temperature, the detection error of a sensor which detects a vibration generated by a knock may be automatically corrected so as not to be influenced by the temperature, thereby improving the accuracy of knock detection.

In some implementations, the sensor assembly which detects a vibration generated by a knock may be installed on a door handle mounted to a door, thereby increasing the accuracy of vibration detection.

In some implementations, for example, a sensor which detects a knock input may be installed at a location that is not affected by heat in an oven, thereby preventing the knock input detection performance of the sensor from deteriorating due to the heat.

In some implementations, for an example, the acceleration sensor of three axial directions may be used so as to distinguish a vibration generated by a knock from vibrations generated by other factors, thereby improving the detection performance for a knock input.

In some implementations, the position of a sensor for detecting a knock input may not be limited to a door, but the sensor may be applied to various positions.

In some implementations, a sensor which detects a vibration generated by a knock may be embodied in the form of a module, thereby simplifying the installation of the sensor, minimizing a structure change by the installation thereof, and precisely analyzing the vibration generated by a knock.

In some implementations, the turning on/off of the lamp may be controlled by a knock, thereby providing usability and increasing efficiency of power.

In some implementations, a user may operate the lamp of the reception space simply by knocking without pressing the on/off switch of the lamp disposed on the upper surface of the reception space.

In some implementations, a device such as a sensor which detects a vibration may be installed at positions other than the door, thereby making additional space for placing the device on the door unnecessary.

In some implementations, it may be preset that a knock input is ignored in specific exceptional situations, thereby providing the safety and usability of the home appliance. For example, in states in which the lamp is already turned on by touching the lamp button, the knock-on function is turned off, and a self-clean operation is underway, the lamp may not be turned on/off despite a user's knock input.

The effects of the present disclosure are not limited to the above effects and will be clearly understood by those skilled in the art.

Advantages and features of the present disclosure and how to achieve the advantages and features will become apparent with reference to implementations described below in detail in conjunction with the accompanying drawings. However, the present disclosure is not limited to the implementations disclosed below and may be embodied in various different forms. The implementations are provided such that the present disclosure is complete, and the present disclosure is provided to fully inform the scope of the present disclosure to those skilled in the art. The present disclosure is defined only by the scope of the claims. Like reference numerals refer to like elements throughout this specification.

In some implementations, the home appliance according to the implementations of the present disclosure may be a home appliance, such as cooking equipment, a refrigerator, a drying machine, and a washing machine, in which a reception space is defined and a viewing window is mounted on the door configured to open/close the reception space such that the inside of the reception space can be seen from the outside.

In some cases, the door which opens and closes the reception space may be opened to allow access to the inside of the reception space, and the door may be closed to close the reception space such that the inside of the reception space is not accessible. It is clearly stated that any home appliance in which the inside of a reception space can be seen through a viewing window mounted on a door may be applied to the present disclosure.

In addition, hereinafter, when a specific shape or structure is required in explaining the home appliance according to the present disclosure, cooking equipment will be described as an example for convenience of the explanation. However, as described above, the home appliance according to the present disclosure is not limited to such cooking equipment.

The home appliance according to the implementation of the present disclosure will be described in detail with reference to the accompanying drawings.

In some implementations, the home appliance 1 may have an exterior defined by a cabinet 10. The cabinet 10 may have a rectangular parallelepiped shape as a whole. In some cases, the home appliance may have various shapes different from the rectangular parallelepiped shape.

In some cases, the cabinet 10 may be required to have predetermined rigidity to protect multiple parts installed therein and thus may be made of various materials corresponding thereto.

In some cases, the home appliance is cooking equipment which can be open in the upper part 11 of the cabinet 10, and may be provided with a device such as a cooktop for cooking food. However, the home appliance of the present disclosure is not limited thereto.

The reception space 23 having a predetermined size may be defined inside the cabinet 10. Such a reception space 23 may be a space in which an object is stored.

For an example, in a case in which the home appliance 1 is cooking equipment, the reception space 23 can be a cooking compartment, and such a cooking compartment may be used as a space in which containers containing food ingredients are received and food is cooked.

For another example, in a case in which the home appliance 1 is a refrigerator, the reception space 23 can be a storage compartment such as a freezer compartment or a refrigerating compartment, and such a freezer compartment or refrigerating compartment can be a space in which food can be stored.

In some cases, the reception space can be defined inside a dishwasher, a washing machine, or a clothing processing device, and dishes and clothes, etc. can be received in this reception space.

In some cases, a reception space 23 can include one or at least two reception spaces. For example, an upper reception space 23 and a lower reception space 32 can be defined. For another example, the plurality of reception spaces 23 and 32 may be partitioned side to side.

In some implementations, the door 40 may be installed at the reception space 23 or 32 and be configured to open and close an open surface of the reception space 23 or 32, preferably, the front surface of the reception space 23 or 32.

The door 40 can comprise an upper door 20 which opens and closes the upper reception space 23 by swinging, and a lower door 30 which opens and closes the lower reception space 32, respectively, by withdrawing and advancing in the lower reception space. In some cases, both the upper door 20 and the lower door 30 may be embodied as swinging doors or drawer-type doors.

In some implementations, the upper door 20 may be configured to swing in a predetermined direction and to open or close the inner space of the reception space 23. For example, when the upper end of the upper door 20 is rotated counterclockwise relative to the lower end of the upper door 20, the reception space 23 may be opened. Contrarily, when the upper end of the upper door 20 is rotated clockwise relative to the lower end of the upper door 20, the reception space 23 may be closed.

In some cases, the home appliance 1 may be provided with components for performing a unique function thereof.

For example, an oven may be provided with various heating means which heats a cooking compartment as the reception space 23. For another example, a refrigerator may be provided with a refrigeration cycle for generating cold air to be supplied to a refrigerating compartment or a freezer compartment as the reception space 23. In some cases, a home appliance such as a dishwasher or a drying machine may be provided with components for performing a unique function thereof.

In some implementations, the viewing window may be mounted on at least one of the plurality of doors 20 and 30. Hereinafter, an example in which the viewing window 21 is installed on the upper door 20 will be described.

For example, such a viewing window 21 may be configured to be integrated with the door 20, and for another example, may be mounted separately on the center portion of the door 20. In the case in which the viewing window 21 is configured to be integrated with the door, a portion of the door 20 can be configured as a see-through door.

In some implementations, the viewing window 21 may be made of a transparent material through which the inside of the reception space can be seen from the outside. For example, the viewing window 21 may be made of glass or transparent plastic. The viewing window 21 may be required to be formed to withstand high temperature and high pressure or to have a waterproof or heat resistance function according to a home appliance to which the viewing window is applied.

In some implementations, a display part 50 may be installed on a side of the upper portion 11 of the cabinet 10.

The display part 50 may display the status information of the home appliance 1 and the progress of functions for operating the home appliance.

Such a display part 50 is for visual and auditory representation of information related to the home appliance 1, and may include a flat-panel display and a speaker. For example, the display part 50 may be configured as a touch panel which receives a user's touch input.

The display part 50 may display a user interface (UI) or a graphic user interface (GUI) related to the operation of the home appliance 1.

Specifically, the display part 50 may include at least one of a liquid crystal display, a thin film transistor-liquid crystal display, an organic light-emitting diode, a flexible display, and a 3D display.

In some implementations, when the display part 50 and a touch sensor configured to detect a touch motion are layered on each other to constitute a touch screen, the display part 50 can be used as an input device in addition to an output device. The touch sensor, for example, may have the shape of a touch film, a touch sheet, a touch pad, and the like.

In some cases, such a touch sensor may be configured to convert change in pressure applied to a specific part of a display or capacitance occurring in a specific part of the display part 50 into an electrical input signal.

The touch sensor may be configured to detect not only the position and area of a touched portion, but also the pressure applied to the touched portion during the touching. When the touch sensor detects a touch input, the touch sensor may transmit a signal corresponding to the touch input to a touch controller.

Figure 3:
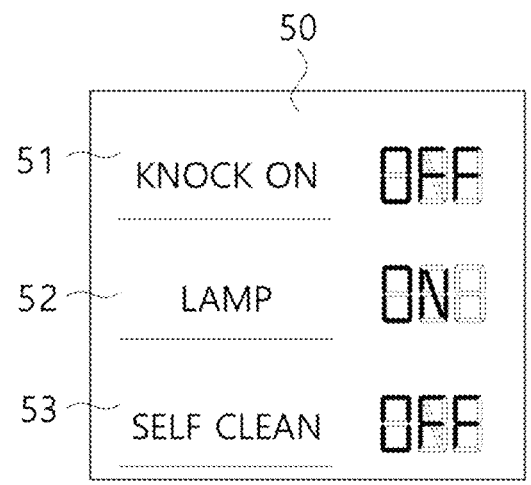
FIG. 3 is a view illustrating an example state of buttons displayed on a display part of the home appliance.

Like an example illustrated in FIG. 3, a plurality of buttons may be displayed on such a display part 50. In some implementations, the displayed buttons may include a knock-on button 51 for presetting the function of automatically turning on/off the lamp 160 installed inside the reception space 23 by a user's knock input, a lamp button 52 for presetting the function of manually turning on/off the lamp 160, and a self-clean button 53 for presetting the self-clean function of the reception space 23 which is a cooking compartment when the home appliance 1 is an oven.

In some cases, when a user touches the knock-on button 51 displayed on the display part 50 once, a knock-on function may be turned on, and when a user touches the knock-on button 51 once more, the knock-on function may be turned off.

The knock-on function can be the function of turning on/off the lamp 160 by a user's knock. That is, in a state in which the knock-on function is turned on, when a user's knock is input, the lamp 160 may be automatically turned on/off. Contrarily, in a state in which the knock-on function is turned off, the lamp 160 may not be turned on/off even if a user's knock is input.

In some cases, when a user intends to use the knock-on function, the user may turn on the knock-on function, but when a user does not intend to use the knock-on function, the user may turn off the knock-on function.

In some cases, the lamp button 52 is intended to manually turn on/off the lamp 160, not by a user's knock. For example, when a user touches the lamp button 52 displayed on the display part 50 once, the lamp 160 may be turned on, and when the user touches the lamp button 52 once more, the lamp 160 may be turned off.

In some implementations, when the lamp 160 is turned on by touching the lamp button 52, the lamp 160 may not be turned off even if a user's knock is input. That is, when the lamp 160 is turned on by a user touching the lamp button 52 manually, the knock-on function may not operate.

In some cases, when the lamp 160 is turned off and a knock is input during a process in which a user manually turns on the lamp 160 to check the inside of the reception space, the intended work cannot be performed. However, when the lamp 160 is turned off by touching the lamp button 52, the knock-on function may operate and the lamp 160 may be turned on by a user's knock. In some cases, after that, when a knock is input, the lamp 160 may be turned off.

In another implementation, the self-clean button 53 may be displayed on the display part 50. A self-clean operation may include functions such as automatically disinfecting and cleaning the reception space 23. In the process of such a self-clean operation, the knock-on function may be preset so as not to be operated. In this case, the lamp 160 may not be turned on/off even if a knock is input by a user.

For example, three buttons can be displayed, but the home appliance of the present disclosure is not limited thereto. Buttons for other additional functions may be displayed, and when an associated button is touched, a function corresponding thereto may be performed. In some cases, the knock-on function may or may not be operated in response to the corresponding function.

In some implementations, a lever manipulation part 62 may be mounted to the front of the cabinet 10. The lever manipulation part 62 can be intended to preset various functions for the operation of the home appliance 1. For example, the lever manipulation part 62 may preset an operation temperature and an operation time. The lever manipulation part 62 may manipulate a cooktop part 60 disposed on the upper part of the home appliance.

A controller 150 that controls the overall operation of the home appliance 1 may be installed therein. In some implementations, such a controller 150 may be installed inside a panel to which the display part 50 is mounted.

In some cases, the position of the controller 150 is not limited thereto. Such a controller 150 may include a microprocessor mounted to a main printed circuit board (PCB), and may preferably be mounted to the main PCB in the form of an IC chip.

In some cases, the controller 150 may receive a value preset by the lever manipulation part 62 and may control functions corresponding to the preset value. For example, the controller 150 may control a heating means installed in the reception space according to a preset temperature of the reception space such that the internal temperature of the reception space 23 is equal to the preset temperature. Furthermore, the controller 150 allows the preset temperature and current internal temperature of the reception space 23 to be displayed.

In some implementations, a sensor assembly 110 may be installed in the rear portion of the lower end of the cabinet 10. However, in the home appliance of the present disclosure, the installation position of the sensor assembly 110 is not limited thereto. For example, the sensor assembly 110 may be installed at a position adjacent to a door 20 or 30, on the front portion of the lower end of the cabinet 10, the front/rear portion of the upper end thereof, or even on the display part 50.

However, in some implementations, specific temperature and pressure may affect the vibration detection performance of the sensor assembly 110, and thus in consideration of this, the sensor assembly 110 can be preferably installed at a position at which temperature and pressure may not affect the vibration detection performance of the sensor assembly.

For example, when the home appliance 1 is an oven, due to heat of high temperature of the inside of a cooking compartment, significant heat may be transmitted to the upper door 20. Accordingly, rather than installing the sensor assembly 110 directly on the door 20, it can be preferable to install the sensor assembly 110 on a different location that is less affected by heat and pressure.

In some cases, in order to minimize the structural change of the existing home appliance 1 and to easily install the sensor assembly 110, the sensor assembly 110 can be preferably installed on the rear part of the cabinet 10 or on the insides of opposite sides thereof.

In some cases, a cover mounted on the rear part of the cabinet 10 or each of the opposite sides thereof may be temporarily removed and, after the installation of the sensor assembly 110, may be mounted thereon again.

Figure 4:
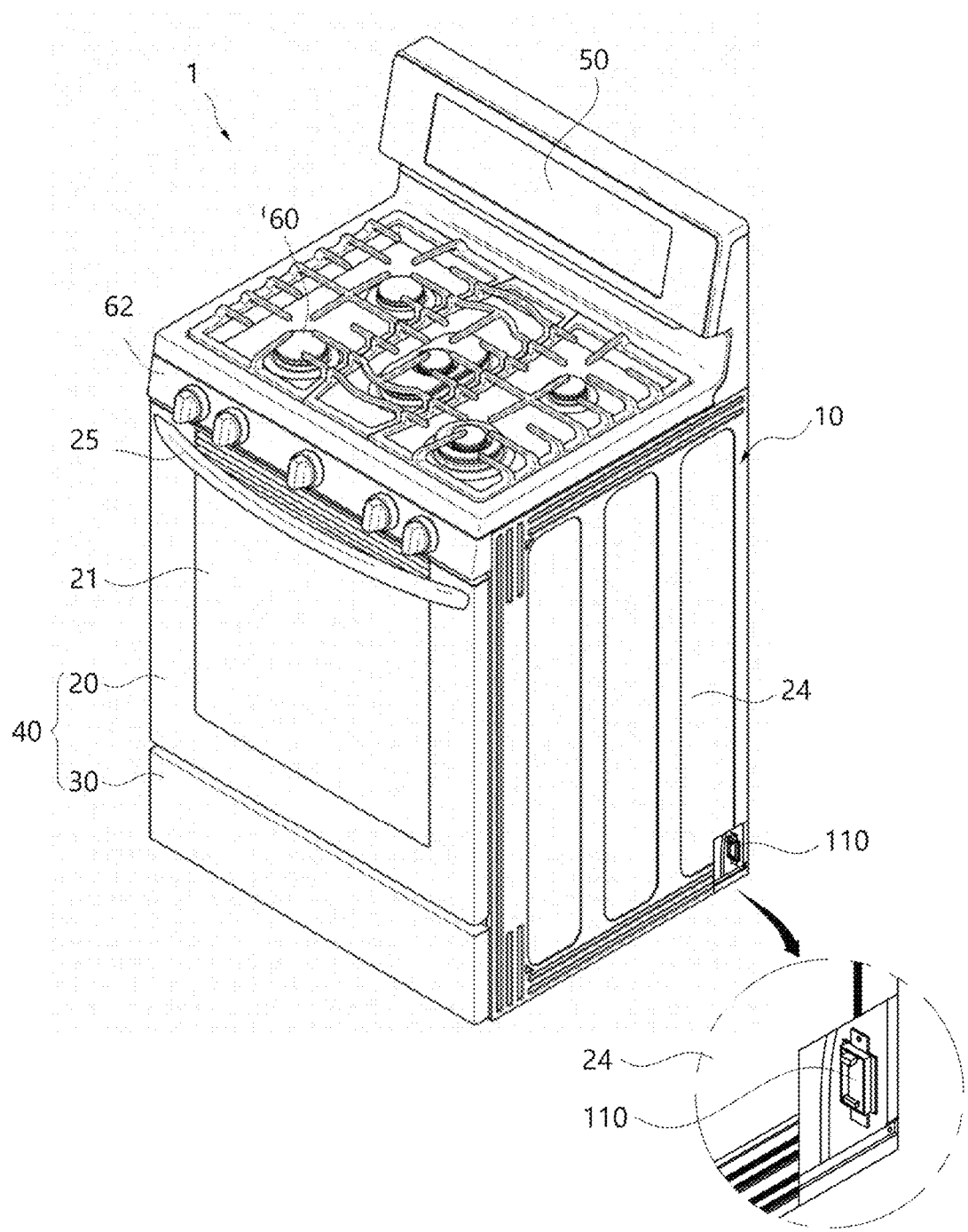
FIG. 4 is a view illustrating an example state in which a sensor assembly is installed in the home appliance.
Figure 5:
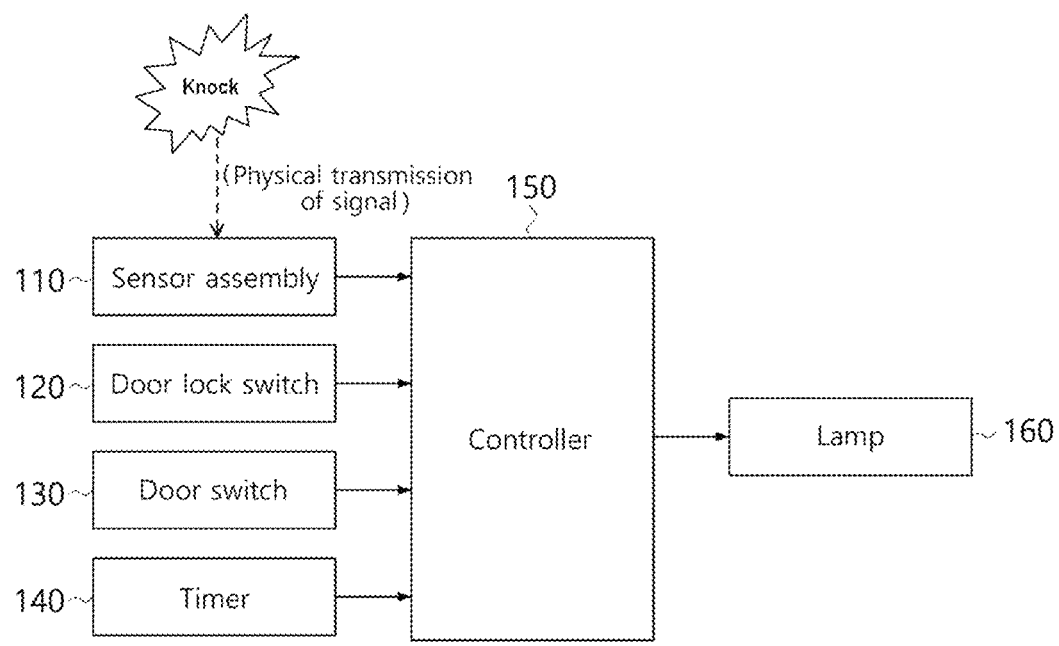
FIG. 5 is a block diagram illustrating an example of the configuration of the home appliance.
Figure 6:
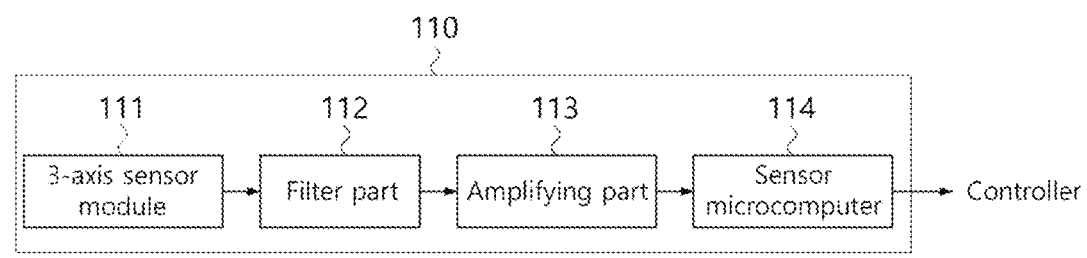
FIG. 6 is a block diagram illustrating an example of the configuration of the sensor assembly.

FIG. 4 illustrates an example in which the sensor assembly 110 is installed on the rear portion of the lower part of the home appliance 1. However, the sensor assembly 110 of the present disclosure is not limited thereto. In some cases, the sensor assembly 110 may be installed on any position of the home appliance 1.

In some implementations, the sensor assembly 110 may be provided in the form of an integrated module such that the sensor assembly 110 can be installed at various positions. Accordingly, when the sensor assembly 110 is provided in the form of an integrated module, the sensor assembly 110 may be installed on the home appliance 1, and the range of the installation position of the sensor assembly 110 may increase.

In some implementations, the sensor assembly 110 may detect a knock input applied to the home appliance 1. Specifically, the sensor assembly 110 may detect a vibration generated by a knock when the vibration generated by the knock is transmitted through media.

Such a sensor assembly 110 may detect vibrations generated by other factors as well as a vibration generated by a knock. However, the sensor assembly 110 may be provided to distinguish vibration generated by a knock input by a user from vibrations generated by other factors so as to detect the vibration generated by the knock.

In some cases, the sensor assembly 110 may accurately distinguish a vibration generated by a user's knock from vibrations generated by other factors. For example, the sensor assembly 110 can detect a specific pattern of the vibration generated by the user's knock to detect the vibration generated by the knock.

The sensor assembly 110, for an example, may include a 3-axis sensor module 111 and a sensor microcomputer 114. For another example, the sensor assembly 110 may further include a filter part 112 and an amplifying part 113.

Figure 7:
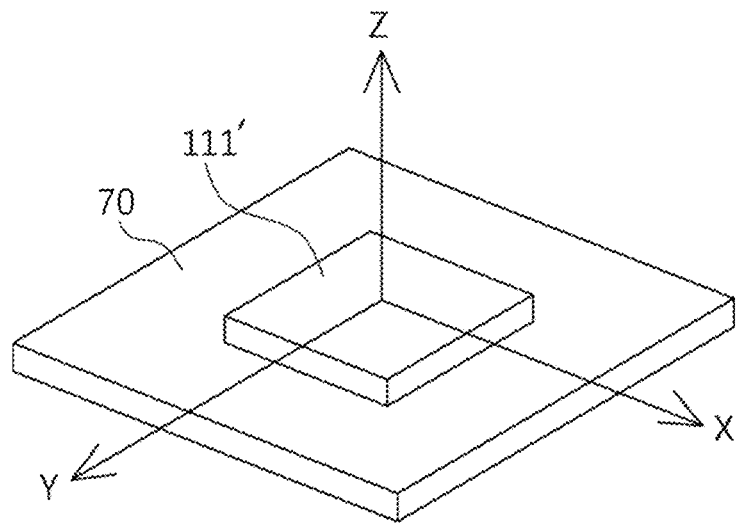
FIG. 7 is a perspective view illustrating an example state of the arrangement of a 3-axis sensor module.

As illustrated in FIG. 7, the 3-axis sensor module 111 may include one 3-axis acceleration sensor which simultaneously detects vibrations transmitted in three axial directions orthogonal to each other.

The 3-axis acceleration sensor may detect components of three axes (x, y, and z axes for convenience of description) of acceleration with one sensor. In some implementations, the 3-axis acceleration sensor may detect each of minute changes (acceleration) in movements of the media due to vibrations transmitted in three axial directions orthogonal to each other.

Figure 8:
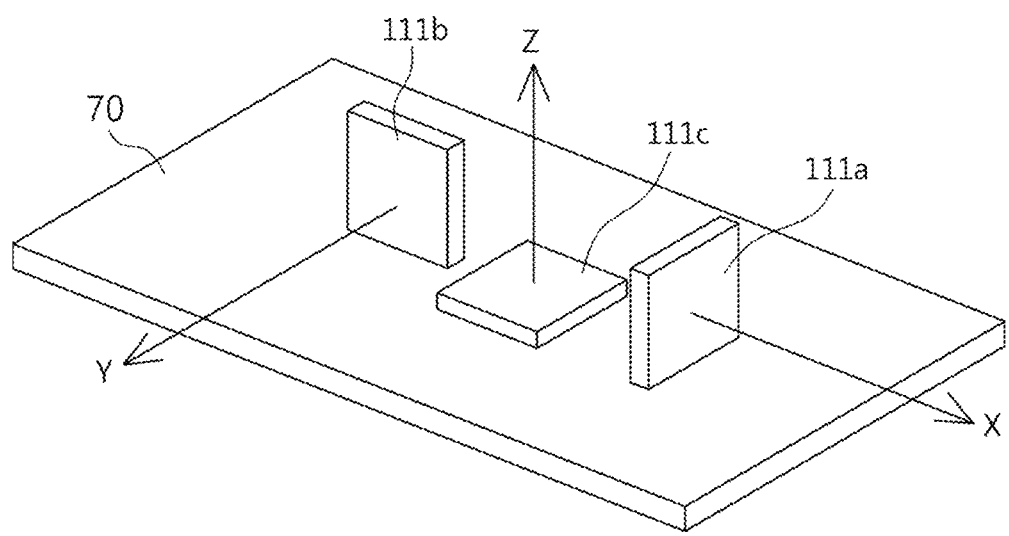
FIG. 8 is a perspective view illustrating an example state of the arrangement of a 3-axis sensor module.

As illustrated in FIG. 8, the 3-axis sensor module 111 may include three independent acceleration sensors. Specifically, these three acceleration sensors may include a first acceleration sensor 111a which detects the vibration of a first axial direction among three axial directions orthogonal to each other, a second acceleration sensor 111b which detects the vibration of a second axial direction among the three axial directions, and a third acceleration sensor 111c which detects the vibration of a third axial direction among the three axial directions.

In the home appliance 1, a plurality of different solid parts may be physically coupled to each other, so a vibration generated by a knock may be transmitted to other portions of the home appliance 1 through these solid parts as media.

In some cases, vibrations generated on the home appliance 1 may be transmitted through media different from each other. For example, the sensor assembly 110 may be installed on the door 20 but may be installed on another position away from the door 20. Even when the sensor assembly 110 is installed on the position away from the door 20, vibrations generated on the door 20 may be transmitted to the sensor assembly 110 through a plurality of solid media connected to each other. Accordingly, the sensor assembly 110 may generate specific signals (hereinafter, referred to as vibration detection signals) corresponding to vibrations transmitted through media different from each other.

An example state of the 3-axis acceleration sensor and the three acceleration sensors are illustrated respectively in FIGS. 7 and 8. However, the present disclosure is not limited thereto. In some implementations, the number of acceleration sensors may be adjusted. As the number of acceleration sensors increases, the accuracy of vibration detection can be improved.

However, in some cases, the combination of the 3-axis acceleration sensor and the three acceleration sensors which can detect vibrations of the three axial directions may be used to detect vibrations of all three-dimensional directions.

In some implementations, the first acceleration sensor which detects the vibration of the first axial direction, and the second acceleration sensor which detects the vibration of the second axial direction may be applied. In some cases, the direction of a vibration generated by a knock applied to the door can be matched with one direction of axial directions of the acceleration sensors.

The sensor assembly 110 may include at least one of the filter part 112 and the amplifying part 113 as required.

In some implementations, vibration detection signals can include unnecessary noise in addition to a vibration detection signal due to a knock input, but the filter part 112 of the sensor assembly 110 can remove the noise.

Signals output after the noise is removed from the filter part 112 can be amplified through the amplifying part 113. The amplified signals may be input to the sensor microcomputer 114.

The sensor microcomputer 114 may be configured separately from the controller 150 and may determine whether there is a vibration generated by a knock input by a user on the basis of the signals output from the amplifying part 113. In some cases, when it is determined that the associated vibration is a vibration generated by the knock input by the user, the sensor microcomputer 114 may notify this to the controller 150.

The 3-axis sensor module 111 and the sensor microcomputer 114 may be mounted on one PCB substrate and may be configured as the sensor assembly 110 having the form of an integrated module in cooperation with the PCB substrate. In some implementations, when the sensor assembly 110 can further include the filter part 112 and the amplifying part 113, the 3-axis sensor module 111, the filter part 112, the amplifying part 113, and the sensor microcomputer 114 may be mounted on one PCB substrate and may be configured as the sensor assembly 110 having the form of an integrated module in cooperation with the PCB substrate.

In some cases, the sensor assembly 110 may be provided as an integrated module and may be installed on, attached to, and detached from any part of the home appliance 1. The position of the installation and attachment of the sensor assembly 110 may be variously determined.

In some cases, the sensor assembly 110 may be disposed at the door 20 and at a position away from the door 20. For example, the sensor assembly 110 may be installed on a handle part 25 installed on a side of the door 20, and may be installed on the rear or bottom part of the cabinet 10. For example, the sensor assembly 110 may be installed on the rear part of the lower part of the home appliance 1. Of course, the home appliance of the present disclosure is not limited thereto.

In a case in which the sensor assembly 110 is installed on the handle part 25 of the door 20, when a knock is applied to the door 20, a vibration generated by the knock may be detected more accurately. In this case, in order to minimize the impact of heat on the sensor assembly 110, it is preferable to dispose an insulating material on the surrounding area of the sensor assembly 110.

In some implementations, parts on which the door 20 and the sensor assembly 110 are installed may be different media. Accordingly, a vibration generated by a knock applied to the door 20 may be transmitted to the sensor assembly 110 through a plurality of media physically connected to each other.

In some cases, a plurality of solid parts which constitute the home appliance 1 and are physically connected to each other may be the media.

When the controller 150 receives a signal (hereinafter, referred to as a knock-on signal) corresponding to a vibration generated by a knock from the sensor assembly 110, specifically, from the sensor microcomputer 114, the controller 150 may turn on/off the lamp 160.

Turning on the lamp 160 can mean that power is supplied to the lamp 160 such that the lamp 160 can brightly illuminate the inside of the reception space 23, and turning off the lamp 160 can mean that power is not supplied to the lamp 160 such that the lamp 160 does not operate.

The lamp 160 may be a lighting device which can brightly illuminate the inside of the reception space 23. For example, the lamp 160 may include an LED module. The lamp 160 may be turned on/off by the control signal of the controller 150.

In some implementations, the lamp 160 may be installed outside the reception space 23 to emit light toward the inside of the reception space 23 or may be installed inside the reception space 23.

In some cases, such a lamp 160 may use various light emitting devices and may be configured in various forms without limitation to be used as long as the lamp 160 is a conventionally known light emitting device.

In some implementations, when a user knocks on a portion of the home appliance 1, the knocked part may become a vibration source, and the vibration by the knock may be generated in the associated part.

Accordingly, the generated vibration may be transmitted to the entire portion of the home appliance 1 through a plurality of media composed of solid parts constituting the home appliance 1. In some cases, such vibration may be transmitted even to the sensor assembly 110 installed on any one portion of the home appliance 1.

The sensor assembly 110 may generate a vibration detection signal corresponding to the transmitted vibration, and may determine whether the transmitted vibration is generated by a user's knock input or by another factor on the basis of the generated vibration detection signal.

When the sensor assembly 110 determines that the transmitted vibration is generated by a user's knock input, the sensor assembly 110 may transmit a knock-on signal to the controller 150. When the controller 150 receives the knock-on signal, the controller 150 may turn on the lamp 160.

When the sensor assembly 110 determines that the transmitted vibration is not generated by a user's knock input, the sensor assembly 110 may not transmit a knock-on signal to the controller 150. In this case, the controller 150 may receive no knock-on signal and thus may not turn on the lamp 160.

In some cases, when a user's knock is detected in the turned-off state of the lamp 160, the lamp 160 may be turned on.

In some cases, when a user's knock input is detected by the sensor assembly 110 in the same manner in the turned-on state of the lamp 160, the controller 150 may turn off the lamp 160.

In some implementations, when a vibration generated by a user's knock is detected, the lamp 160 may be turned on to illuminate the inside of the reception space 23 such that the user can see the inside of the reception space 23 from the outside through the viewing window 21 mounted to the door 20.

Furthermore, in the turned-on state of the lamp 160, when a user knocks, a vibration generated by the knock may be detected and the lamp 160 may be automatically turned off.

In some cases, a user may turn on/off the lamp 160 only with a knock and may check the inside of the reception space 23 of the home appliance 1 without opening the door 20.

Hereinafter, the 3-axis sensor module 111 will be described in more detail.

In some implementations, the 3-axis sensor module 111 may be provided in the form of a plate having a predetermined thickness, but the 3-axis sensor module 111 of the present disclosure is not limited thereto and may be embodied in various shapes, such as a hexahedron.

As illustrated in FIG. 7, in some implementations, the 3-axis sensor module 111 may be provided as one 3-axis acceleration sensor 111' which can simultaneously detect vibrations of three axial directions. That is, one 3-axis acceleration sensor 111' may simultaneously detect vibrations transmitted in three axial directions.

As illustrated in FIG. 8, in some implementations, the 3-axis sensor module 111 may include three acceleration sensors which are independent of each other, wherein these three acceleration sensors may include the first acceleration sensor 111a which detects the vibration of the first axial direction of the three axial directions, the second acceleration sensor 111b which detects the vibration of the second axial direction thereof, and the third acceleration sensor 111c which detects the vibration of the third axial direction thereof. In the drawing, for example, the first, second, and third axes are expressed as x, y, and z axes, respectively.

In some cases, these acceleration sensors 111', 111a, 111b, and 111c can include a capacitive acceleration sensor, a piezoelectric acceleration sensor, and a piezoresistive acceleration sensor, and the present disclosure is not limited to any one thereof.

The 3-axis sensor module 111 may detect the vibrations of three-axial directions, that is, the vibrations of x, y, and z axial directions orthogonal to each other. In some cases, the detection of the vibrations of the x, y, and z axial directions may be performed independently of each other and simultaneously.

In some implementations, these acceleration sensors 111', 111a, 111b, and 111c may be mounted on a PCB substrate 70, and other components, that is, the filter part 112, the amplifying part 113, and the sensor microcomputer 114 may also be mounted on the PCB substrate 70. In some cases, the PCB substrate 70 on which the components are mounted may be provided in the form of an integrated module.

The type of vibration which may be applied to the home appliance 1 may be various. For example, there may be vibrations generated from a motor, a heating means, and a refrigeration cycle, etc. mounted inside the home appliance. Furthermore, a vibration may be generated by people inadvertently bumping or randomly tapping the home appliance 1. When a person passes by the home appliance 1, vibration may be generated by the person's footstep.

In some implementations, in consideration of the number of different cases for generating a vibration, a vibration due to a knock by input by a user is required to be distinguished from vibrations generated by other factors such that the user can check the inside of the reception space through the viewing window 21.

In some cases, it is required to increase a discrimination power between a vibration caused by a knock and vibrations caused by other factors. That is, it is required to increase a discrimination power between a vibration detection signal corresponding to a vibration generated by a knock and vibration detection signals corresponding to vibrations generated by other factors.

In some implementations, when the 3-axis sensor module 111 includes the first, second, and third acceleration sensors 111a, 111b, and 111c which are independent of each other, it is important that one acceleration sensor of these three acceleration sensors is installed such that an axial direction thereof for detecting a vibration coincides with the direction of vibration generated by a knock.

In some implementations, when the 3-axis sensor module 111 is configured as one 3-axis acceleration sensor 111', it is important that the 3-axis acceleration sensor 111' is installed such that one axial direction of three axial directions of the 3-axis acceleration sensor 111' coincides with the direction of a vibration generated by a knock.

Figure 9:
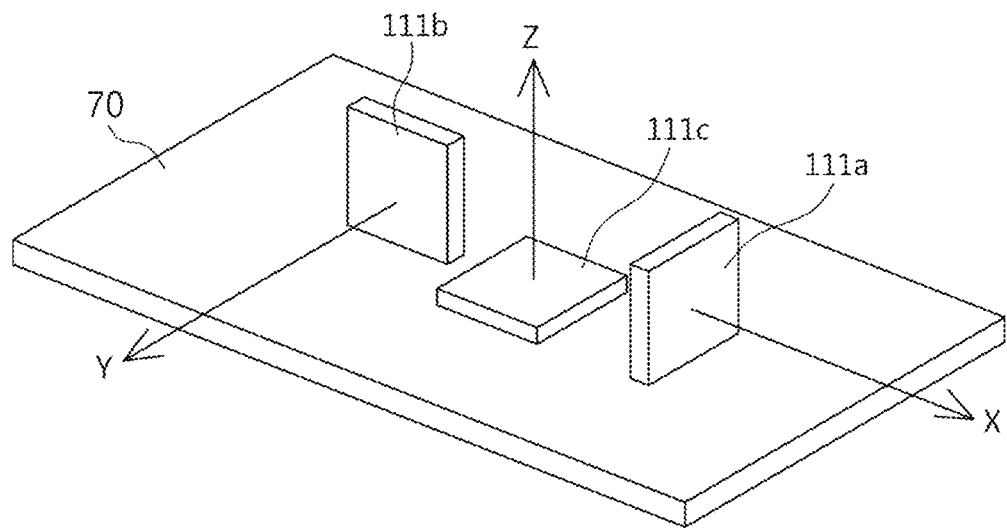
FIG. 9 is a view illustrating the example state of the alignment of one axial direction of the 3-axis sensor module with the direction of vibration generated by a knock.

FIG. 9 illustrates an example in which an x-axis direction among x, y, and z-axis directions coincides with the direction of vibration generated by a knock. Accordingly, the direction of one axis of three axes may be in alignment with the direction of a vibration generated by a knock such that the vibration generated by the knock can be more clearly and accurately distinguished from the vibrations of y and z-axis directions.

In some implementations, the alignment of an axial direction for detecting a vibration with the direction of the vibration is important. The direction of a vibration generated by a knock may be determined according to the direction of the position of the cabinet 10 to which the knock is applied.

For example, when a knock is applied to the front part (for example, the door) of the cabinet 10, the direction of a vibration generated by the knock is generated only in one axial direction. This means that vibrations transmitted in axial directions other than the one axial direction is not the vibration generated on the front part.

When it is assumed that the direction of a vibration generated by a knock applied to the front part is an x-axis direction, the direction of a vibration generated by a knock applied to the side part of the cabinet other than the front part may be a y-axis direction, and the direction of a vibration generated by a knock applied to the upper part of the cabinet may be a z-axis direction.

In some cases, the vibrations detected in the y-axis direction or z-axis direction may not be the vibration generated by the knock applied to the front part, and accordingly, the signal of the x-axis direction is preferentially considered and determined. Accordingly, among vibration detection signals of three axial directions, the vibration detection signal of any one axial direction (e.g., an x axis direction) which coincides with the direction of the vibration generated by a knock may be extracted and the extracted vibration detection signal may be used to determine whether there is the vibration generated by the knock.

In some implementations, the 3-axis sensor module 111 can be different from a conventional sensor that detects a sound wave. Since the conventional sound wave detection sensor does not consider the directionality of a sound wave, it is impossible to know a portion to which a knock is applied. Furthermore, the conventional sound wave detection sensor may not distinguish a vibration generated in a portion to which a knock is applied from vibrations generated in other portions, which may cause malfunction.

In some implementations, in the case of a vibration caused by a knock input by a user, the direction of the vibration may be determined according to the position of a part to which the knock is applied. That is, a vibration caused by a knock may be generated only in one direction. For example, when a knock is applied to the door 20 installed on the front part of the home appliance 1, a vibration may be generated only in a front-to-rear direction. That is, the vibration may be generated only in one axial direction of x, y, and z-axis directions.

In some implementations, when a knock is applied to the front part of the home appliance 1, it is assumed that a vibration occurs in the first axial direction (e.g., an x-axis direction). In some cases, the direction of vibration may vary depending on how the 3-axis sensor module 111 is arranged.

In some implementations, when a user knocks on the door 20 or the viewing window 21 to check the inside of the reception space through the viewing window 21, a vibration may be generated only in the x-axis direction by the knock and thus the 3-axis sensor module 111 may detect the vibration of the x-axis direction.

In some implementations, in the case in which a knock is applied to the door 20 or the viewing window 21, a vibration may be generated in the x-axis direction by the knock, but vibrations caused by other factors may also be generated.

In some cases, the sensor microcomputer 114 can detect in advance that the direction of the vibration caused by the knock is the x-axis direction. When the 3-axis sensor module 111 receives a vibration detection signal corresponding to the vibration of the x-axis direction, the sensor microcomputer 114 may check the pattern of the vibration detection signal to determine whether the vibration is generated by the knock.

When the sensor microcomputer 114 receives a vibration detection signal corresponding to the vibration of the y or z-axis direction other than the x-axis direction, the sensor microcomputer 114 may determine that there is no vibration generated by a knock even if the pattern of the vibration detection signal is the same as the pattern of a vibration detection signal caused by the knock. In some cases, the sensor microcomputer 114 can detect that the vibration caused by the knock is generated in the x-axis direction.

Figure 10:
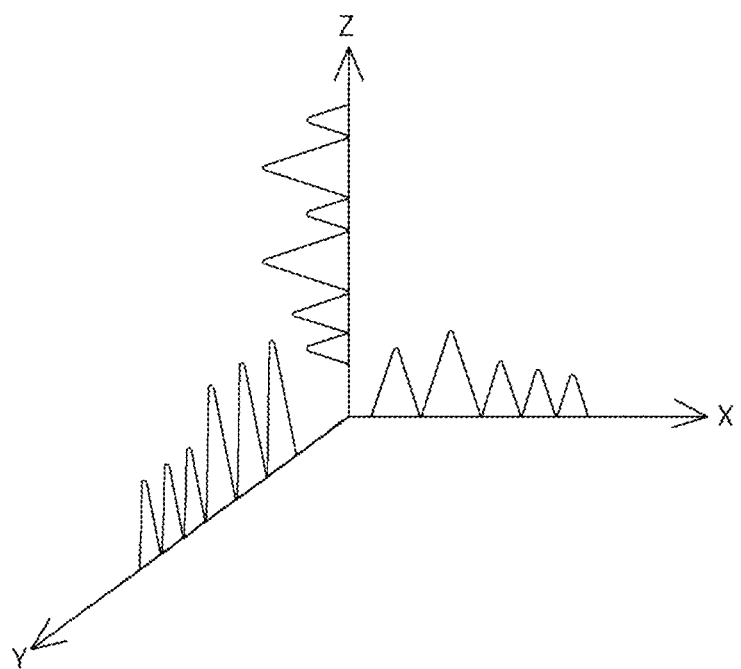
FIGS. 10 and 11 are views illustrating an example of vibration detection signals detected by the 3-axis sensor module.
Figure 11:
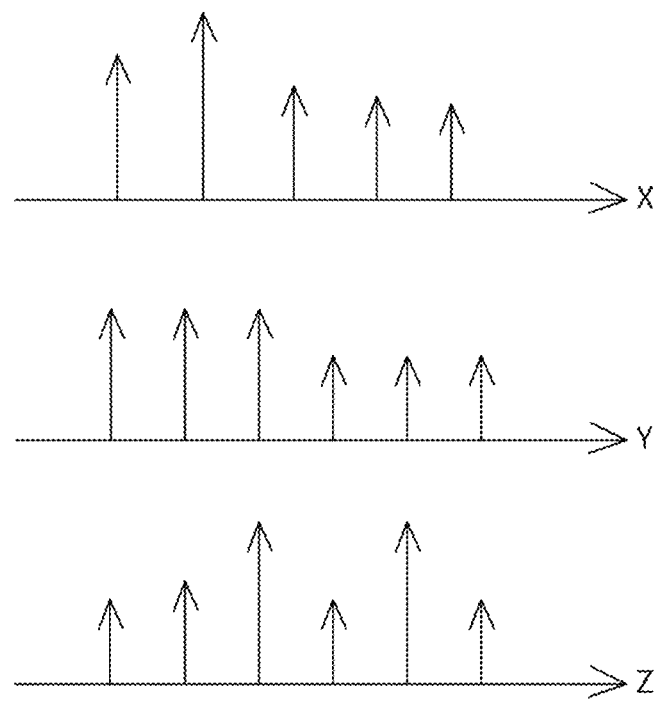

FIG. 10 illustrates the example of the vibration detection signals of three axial directions detected by the 3-axis sensor module, and FIG. 11 illustrates the strengths of the signals by simplifying the vibration detection signals of three axial directions.

In some implementations, the 3-axis sensor module 111 is installed such that the direction of the first axis of three axes is in alignment with the direction of vibration generated by a knock, but when the alignment is misaligned for some reason, this can be automatically corrected.

For example, any one axis of the axes of the 3-axis sensor module 111 can be arranged to coincide with the direction of gravity. Since the any one axis is disposed in the direction of gravity, gravitational acceleration may be measured in the direction of the associated axis, and when the gravitational acceleration measured by the 3-axis sensor module 111 changes, the sensor microcomputer 114 may determine that the alignment of the any one axis disposed to coincide with the direction of gravity is misaligned.

In some cases, the sensor microcomputer 114 can calculate each gravitational acceleration of three axial directions measured by the 3-axis sensor module 111, and calculates the degree of the misalignment of the any one axis disposed to coincide with the direction of gravity. Additionally, the degree of the misalignment may be corrected on the basis of a calculated value.

In some implementations, the 3-axis sensor module 111 may be affected by the temperature of the surrounding area of the home appliance 1, so the magnitude of the vibration detection signals may be corrected according to the ambient temperature. In some implementations, correction values for the sizes of the vibration detection signals may be preset in response to the ambient temperature, and according to these preset values, it can be possible to correct the sizes of the vibration detection signals according to the ambient temperature. In some cases, the home appliance 1 may include a temperature sensor which detects the ambient temperature of the sensor assembly 110.

In some implementations, the home appliance 1 may include the reception space 23 defined inside the cabinet 10 constituting the exterior of the home appliance 1 such that objects can be received in the reception space 23.

One surface of the reception space 23, that is, a front part thereof is preferably opened. The door 20 may be installed on the front part and be configured to open/close the reception space 23.

The viewing window 21 may be mounted to at least a portion of the door 20. A user may see the inside of the reception space 23 from the outside through the viewing window 21 without opening the door 20.

In some cases, the inside of the reception space 23 may be dark in a state in which the door 20 is closed, and may not be accurately checked, so the lamp 160 may be installed inside the reception space 23. Such a lamp 160 may be installed outside of the reception space 23 so as to emit light toward the inside of the reception space 23.

In some cases, since the inside of the reception space 23 may have a high temperature, the lamp 160 may be made of a material having high durability against high temperature.

The lamp 160 may be turned on/off by a lighting part 180, and such a lighting part 180 may be operated by the controller 150.

When the controller 150 is notified from the sensor assembly 110 that a knock is input by a user, the controller may operate the lighting part 180 such that the lamp 160 is turned on.

The sensor assembly 110 may detect a vibration caused by a knock applied to the home appliance 1. In addition, the sensor assembly 110 may also detect vibrations generated by various causes in the home appliance 1.

In some cases, the sensor assembly 110 may specifically distinguish and determine vibration caused by a knock among various vibrations. When determining that the vibration is generated by the knock, the sensor assembly 110 may notify this to the controller 150.

In some cases, the sensor assembly 110 may determine whether or not a knock is input on the basis of vibration detection signals corresponding to vibrations, and when vibration detection signals of a preset threshold or more are continuously detected at regular time intervals, it may be determined that a vibration caused by a knock is generated. That is, it may be determined that a knock is applied.

For example, when a knock is applied with "knocking sounds" at regular time intervals, the sizes of vibrations corresponding to "the knocking sounds" may be greater than or equal to a preset threshold, and the sizes of vibrations corresponding to regular time intervals which are not the vibrations corresponding to "the knocking sounds" may be smaller than the preset threshold.

Accordingly, the sensor assembly 110 can determine whether there is a vibration generated by a knock by checking the pattern of a vibration detection signal.

In some implementations, in a state in which the lamp 160 is turned on, the controller 150 may allow the lamp 160 to be turned off when a user's knock is input.

Furthermore, in a state in which the lamp 160 is turned on, when a user's knock is not input for a preset period of time, the controller 150 may allow the lamp 160 to be turned off.

In some implementations, the home appliance 1 may further include a door lock switch 120, a door switch 130, and a timer 140. These components 120, 130, and 140 may transmit state information to the controller 150 and may operate according to the control signal of the controller 150.

In some cases, the door lock switch 120 can perform a locking or unlocking function of the door 20 of the home appliance 1. When the home appliance 1 is being used, the locking/unlocking of the door 20 may be required to prevent accidents.

For example, in a case in which the home appliance 1 is an oven, when food is being cooked in the oven, the door 20 may be locked such that the door 20 is not opened. Conditions for maintaining the locked state of the door 20 may be variously preset.

For example, while the self-clean function of a cooking compartment is being performed, high heat may be generated. For another example, while the washing machine performs washing, the washing machine may be required to be locked.

In some cases, even if a knock is input while the door 20 is maintained to be locked, the lamp 160 may not be turned on, but may be maintained to be turned off. Accordingly, a situation in which the lamp 160 is not turned on even if a knock is detected in the turned-off state of the lamp 160 is referred to as "an exceptional situation".

In some implementations, the exceptional situation may include, for example, a self-clean situation for cleaning the inside of the cooking compartment of an oven when the home appliance 1 is the oven.

In some cases, for example, the exceptional situation may include an opened state of the door, a state in which the self-clean function is being performed, a state in which the door is preset to be locked for a predetermined period of time after the self-clean function, a state in which the lamp is turned on by touching the button of the lamp, a state in which the setting of the knock-on function is off, and a state in which the lamp is blinking after the home appliance 1 is warmed up.

Further exceptional situations may be preset. In these exceptional situations, despite a user's knock, the lamp may not be turned on. This is intended to preset some exceptional situations in which the lamp is required to be prevented from being turned on despite a knock input for safety or energy saving.

In some cases, the controller 150 may check whether the door 20 is locked through the door lock switch 120 and, at the same time, whether the home appliance 1 is in an exceptional situation. In these exceptional situations, the controller 150 may not turn on the lamp 160.

In some implementations, the door lock switch 120 may transmit information on whether the door 20 is locked or unlocked to the controller 150 and, contrarily, may perform the locking and unlocking of the door 20 according to a control signal transmitted from the controller 150.

The door switch 130 may perform the opening/closing of the door 20. When the door switch 130 is turned on, this means that the door 20 is opened, but when the switch 130 is turned off, this means that the door 20 is closed.

In some implementations, the door switch 130 may transmit information on whether the door 20 is in an opened or closed state to the controller 150.

Figure 12:
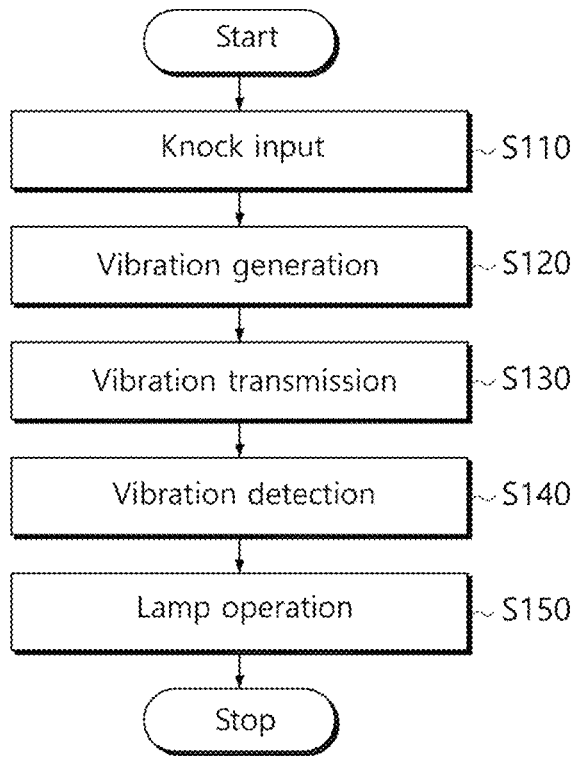
FIG. 12 is a flowchart illustrating an example of the operation of the home appliance.

The operation of the home appliance 1 will be described in detail with reference to FIG. 12.

IN some implementations, in order to see the inside of the reception space 23 of the home appliance 1 from the outside through the viewing window 21 mounted on the door 20, a user can knock on the viewing window 21.

In some cases, the type of knock has not been specifically preset, but may generally be preset as "knocking sounds". In some cases, the knock may be preset in a different manner.

In some implementations, "knocking sounds" are defined as knocks, and "a first knocking sound" as a knock by first knocking is referred to as "a 1st knock", and "a second knocking sound" as a knock by second knocking is referred to as "a 2nd knock".

In some implementations, a knock can be applied to the viewing window 21 mounted on the door 20, but the present disclosure is not limited thereto. A position for knocking may be variously preset. [S110: a knock input step]

In some implementations, when a knock is applied to the viewing window 21, a vibration may be generated on the associated position of the viewing window to which the knock is applied. In this case, the vibration generated on the associated position of the viewing window 21 may have a predetermined directionality. For example, on the associated position, the vibration may be generated in a front-to-rear direction.

In some cases, the front-to-rear direction of a vibration is referred to as the x-axis direction of the 3-axis sensor module 111. Accordingly, when a knock is applied to the viewing window 21, vibration may be generated in the x-axis direction.

In some cases, when a knock is applied with "knocking sounds" at regular time intervals, two vibrations may be generated respectively by the 1st knock and the 2nd knock. Furthermore, after the two vibrations, small residual vibrations may subsequently occur. [S120: a vibration generation step]

The vibrations generated in this manner may be transmitted through a plurality of solid parts constituting the home appliance 1 to the entire portion of the home appliance 1.

In some implementations, the home appliance 1 may comprise a plurality of large and small solid parts physically coupled with each other, so when a vibration is generated at any one position of the home appliance 1, the vibration may be transmitted through the plurality of solid parts to the entirety of the home appliance 1.

In some cases, the intensity of the vibration may be attenuated to some extent depending on the connection state of solid parts and a distance in which the vibration is transmitted, but even minute vibrations may be transmitted because each of the solid parts is physically connected to each other. [S130: a vibration transmission step]

Vibrations transmitted through solid parts may be transmitted even to the sensor assembly 110 installed at a position apart from the door 20 by a predetermined distance. Accordingly, the sensor assembly 110 may detect the transmitted vibrations.

In some cases, a vibration caused by a knock applied to the viewing window 21 may be generated in the x-axis direction, and the sensor assembly 110 may detect the vibration of the x-axis direction.

In some cases, the sensor assembly 110 may include the 3-axis sensor module 111. The 3-axis sensor module 111 can detect the vibrations of three axial directions, that is, the vibrations of x, y, and z-axis directions.

In some cases, when the vibration of the x-axis direction generated by a knock applied to the viewing window 21 is transmitted, the 3-axis sensor module 111 may detect the vibration of the x-axis direction. In some cases, the 3-axis sensor module 111 may be disposed such that the x-axis direction is in alignment with the direction of vibration caused by a knock.

In this case, in addition to vibration generated by a knock, vibrations of x, y, and z-axis directions generated by any cause may occur, and the 3-axis sensor module 111 may detect all these vibrations.

The 3-axis sensor module 111 may generate vibration detection signals corresponding to the detected vibrations. In some cases, the generated vibration detection signals may be input through the filter part 112 and the amplifying part 113 to the sensor microcomputer 114.

The sensor microcomputer 114 may analyze the vibration detection signals of x, y, and z-axis directions and may determine whether a user's knock is input, that is, whether a vibration by a user's knock is generated. When it is determined that a user's knock is input, the sensor microcomputer 114 may notify the controller 150 that a user's knock is input. [S140: a vibration detection step]

In some implementations, the controller 150 which controls the overall operation of the home appliance 1 may turn on/off the lamp 160 when receiving a user's knock input from the sensor assembly 110. When a vibration by a knock is detected in the turned-off state of the lamp 160, the lamp 160 may be turned on. When a vibration by a knock is detected in the turned-on state of the lamp 160, the lamp 160 may be turned off.

For example, in the turned-off state of the lamp 160, when the sensor assembly 110 determines that a user's knock is input by the user knocking on the viewing window 21, the controller 150 may turn on the lamp 160.

In addition, in the turned-on state of the lamp 160, when the sensor assembly 110 determines that a user's knock is input by the user knocking on the viewing window 21, the controller 150 may operate the lighting part 180 to turn off the lamp 160. [S150: a step of operating the lamp]

In some implementations, the controller 150 may determine whether a preset predetermined period of time elapses in the turned-on state of the lamp 160. Whether the preset predetermined time has elapsed may be checked by using the timer 140. When the predetermined time elapses, the lamp 160 may be automatically turned off.

In some cases, in order to check the inside of the reception space 23 through the viewing window 21, a user may knock on the viewing window 21 to turn on the lamp 160. After that, even if the user forgot to turn off the lamp 160, the lamp 160 may be automatically turned off after a predetermined period of time, so unnecessary power consumption can be prevented.

In some cases, a user may see the inside of the reception space 23 through the viewing window 21 mounted to the door 20 by the user's simple knock.

The vibration detection step S140 will be described in detail with reference to FIGS. 13 to 15.

In some implementations, the sensor microcomputer 114 can analyze vibration detection signals of x, y, and z-axis directions and can determine whether a user's knock is input, that is, a vibration caused by a user's knock is generated. When it is determined that a user's knock is input, the sensor microcomputer 114 may output a knock-on signal to the controller 150 such that the sensor microcomputer 114 notifies to the controller 150 that a user's knock is input.

When it is assumed that the direction of a vibration caused by a knock is an x-axis direction, the sensor microcomputer 114 may extract and analyze a vibration detection signal of the x-axis direction even if vibration detection signals of x, y, and z-axis directions are simultaneously input. In some cases, this is intended to consider only the vibration of the x-axis direction since vibration generated by a knock applied to the viewing window 21 is generated in the x-axis direction.

The sensor microcomputer 114 may know in advance that only the vibration of the x-axis direction is a vibration caused by a knock applied to the viewing window 21 and thus may analyze the vibration detection signal of the x-axis direction. In some cases, the sensor microcomputer 114 may compare the vibration detection signal of the x-axis direction with the vibration detection signals of the y and z-axis directions.

In some cases, the vibration detection signal of the x-axis direction can be a signal corresponding to a vibration caused by a knock but a vibration may be generated in the x-axis direction even by the vibrations of the y and z-axis directions.

In some implementations, it can be determined whether the size of the vibration detection signal of the x-axis direction is at least the size of the first threshold $Zth1$. The size of the vibration detection signal of the x-axis direction may correspond to the intensity of a knock. For example, when a knock is applied hard, the size of the vibration detection signal may increase.

In addition, the vibration detection signal may correspond to a vibration caused by a knock, and residual vibrations may occur in the aftermath of the vibration caused by the knock. Accordingly, the vibration detection signal may include signals corresponding to the residual vibrations.

In some cases, a time at which vibrations 201 caused by the 1st knock and residual vibrations 202 are generated may be referred to as a 1st knock holding time which is denoted as T1.

When there is a vibration detection signal having a size that is greater than or equal to $Zth1$, waiting may be performed for a preset period of time. For example, when a knock is applied with "a knocking sounds", there may be a time interval between the 1st knock and the 2nd knock. Such a time interval may be referred to as the preset period of time and may be denoted as T2. In some cases, T2 can be time taken to wait for the input of the 2nd knock after the 1st knock is input.

In T2, vibration detection signals that are smaller than $Zth1$ may be generated. In some cases, after the vibration 201 of the 1st knock is generated in T1, a vibration may not be generated or minute vibrations 203 smaller than $Zth1$ may be generated until a vibration 204 of the 2nd knock is generated.

The vibrations 203 in T2 may be minute vibrations generated by other factors after the vibration 201 generated by the 1st knock and the residual vibrations 202 in T1 disappear.

After T2, it may be determined whether there is a vibration detection signal of a preset second threshold $Zth2$ or more. After T2, the vibration detection signal of the $Zth2$ or more may be generated by the 2nd knock.

In some cases, vibration 204 caused by the 2nd knock and residual vibrations 205 may be referred to as a 2nd knock holding time which is denoted as T3.

The vibration 204 generated by the 2nd knock and the residual vibrations 205 may have a pattern similar to the pattern of the vibration 201 generated by the 1st knock and the residual vibrations 202. In some cases, the sizes of the vibration detection signals of the vibrations may be changed according to the intensity of each of the 1st knock and the 2nd knock.

When the vibration detection signal generated by the 2nd knock having the size of Zth2 or more is detected, waiting may be performed for a predetermined period of time, which may be a period of time T3 for which the residual vibrations 205 decrease.

In some cases, when a knock is applied with "knocking sounds", a predetermined period of waiting time after the 2nd knock may be denoted as T4. The period of waiting time of T4 may be a period of time taken to compare the vibration detection signal of the x-axis direction with the vibration detection signals of the y and z-axis directions different from the x-axis direction after the 2nd knock.

In some implementations, for example, the direction of the x-axis direction is the direction of vibration generated by a knock, and thus the vibration detection signal of the x-axis direction may be analyzed such that the vibration detection signal of the x-axis direction is compared with the vibration detection signals of the y and z-axis directions in T4.

In some cases, the vibration detection signal of the x-axis direction may be a signal corresponding to a vibration generated by a knock but may be a signal generated by the aftermath of vibrations generated in the y and z-axis directions.

For example, in a case in which a user applies an impact to the side or top part of the cabinet or generates a strong footstep, while strong vibrations are generated in the y and z-axis directions, a vibration may be generated even in the x-axis direction.

In some cases, even if a vibration detection signal of the x-axis direction is detected, the vibration detection signal may not be the vibration detection signal caused by a knock, so the vibration detection signal of the x-axis direction caused by the vibrations generated in the y and z-axis directions is required to be excluded from the knock-on signal.

In some implementations, the vibration detection signal of the x-axis direction may be compared with the vibration detection signals of the y and z-axis directions, and when the maximum value of a vibration detection signal of any one axial direction of the y and z-axis directions is greater than the maximum value of the vibration detection signal of the x-axis direction, it may be determined that there is no vibration generated by a knock. In some cases, this excludes a case in which vibration of the x-axis direction is detected by strong knocks input in the y and z-axis directions.

In some implementations, T4, that is, a period of time at which the vibration detection signal of the x-axis direction and the vibration detection signals of the y and z-axis directions are compared with each other may be a period of time between T2 and T3.

After T4, there may be a period of time for which the vibration caused by the 2nd knock disappears. Such a period of time may be denoted as T5, at which it is checked that no vibration is generated any longer in the x-axis direction. In some cases, after the period of time of T5 elapses, it may be checked that no vibration is generated any longer.

In T5, a vibration generated by a knock may disappear but a vibration caused by another factor may be generated. In some cases, in T5, the size of a third threshold Zth3 and the size of a vibration detection signal of the vibration by the another factor may be compared with each other, and when the size of the vibration detection signal is smaller than Zth2, it may be determined that the vibration by the 2nd knock is disappearing. In some cases, the vibration by the 2nd knock may be disappearing but minute vibrations 206 caused by other factors may be generated. When these minute vibrations 206 are smaller than Zth3, the minute vibrations 206 may not affect knock detection.

Figure 13:
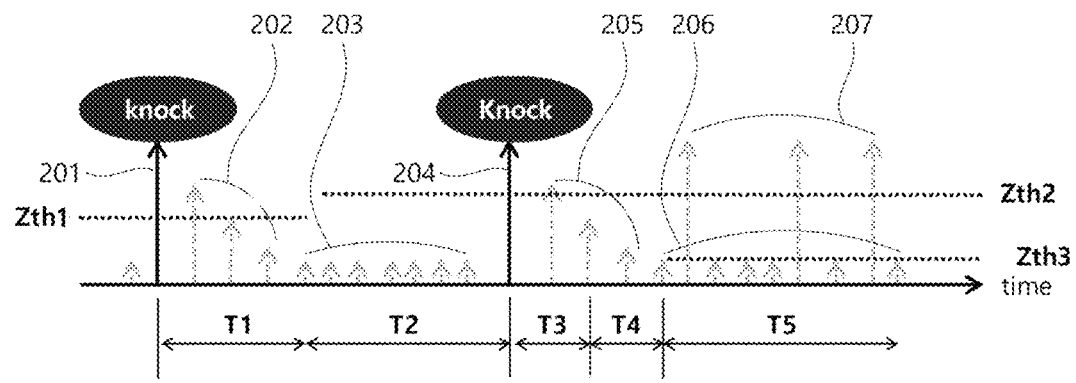
FIG. 13 is a view illustrating an example of a vibration detection signal for vibration generated by a knock for describing the vibration in the home appliance.

As illustrated in FIG. 13, in some implementations, when vibrations 207 greater than Zth3 are detected in T5, the vibrations 207 may be vibrations by other factors, so although sizes of the vibrations 207 are greater than Zth1 and Zth2, the vibrations 207 may not be detected as vibrations by a knock. Zth3 may be preset to be 40% to 70% of Zth2 and is preferably preset to be 60% of Zth2.

In some cases, there can be (i) T1, wherein a vibration detection signal of the x-axis direction is detected, and the vibration detection signal 201 of Zth1 or more is generated by the 1st knock and the vibration detection signals 202 are generated by residual vibrations due to the 1st knock, (ii) followed by T2, in which vibration detection signals 203 generated by minute vibrations are detected while waiting for the input of the 2nd knock, next, (iii) T3 in which the vibration detection signal 204 of Zth2 or more is generated by the 2nd knock and vibration detection signals 205 generated by residual vibrations of the 2nd knock, and afterward, (iv) T5 in which vibration detection signals 206 generated by minute vibrations while the vibrations by the 2nd knock are disappearing, wherein the sensor microcomputer 114 may determine that a knock having "knocking sounds" is applied to the viewing window 21 and in this case, may transmit a knock-on signal to the controller 150 to notify the occurrence of the knock to the controller 150.

Figure 14:
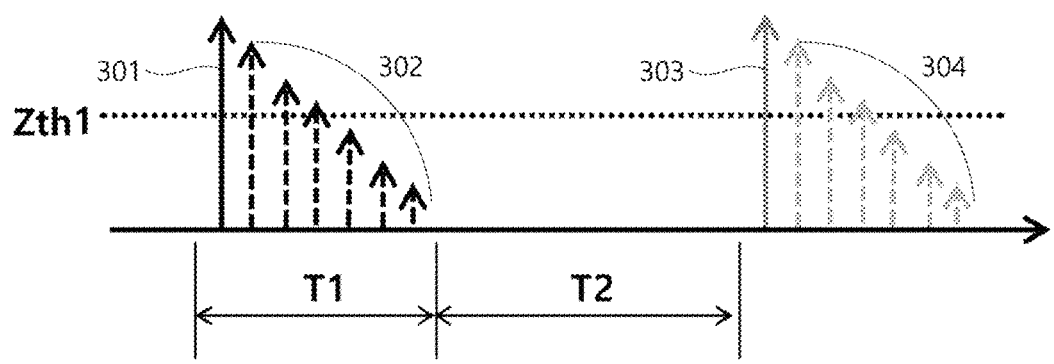
FIGS. 14 and 15 are views illustrating examples of vibration detection signals generated by a knock in the home appliance.

As illustrated in FIG. 14, in some implementations, in the case of a normal knock, in T1, a vibration detection signal 301 may be generated by a 1st knock and the vibration detection signals 302 may be generated by residual vibrations due to the 1st knock. T2 may be a period of time for waiting for a 2nd knock after the 1st knock and in T2, minute vibrations may be detected or may not be detected.

After T2 elapses, a vibration detection signal 303 may be generated by the 2nd knock and vibration detection signals 304 may be generated by residual vibrations due to the 2nd knock.

In the case of such a normal knock, T2 may be secured for a predetermined period of time. The interval of T2 may be determined according to the intensity of the 1st knock.

When the vibration detection signal 301 generated by the 1st knock is not large, that is, when the 1st knock is applied somewhat weakly, Zth1 and Zth2 may be preset to have the same sizes.

Figure 15:
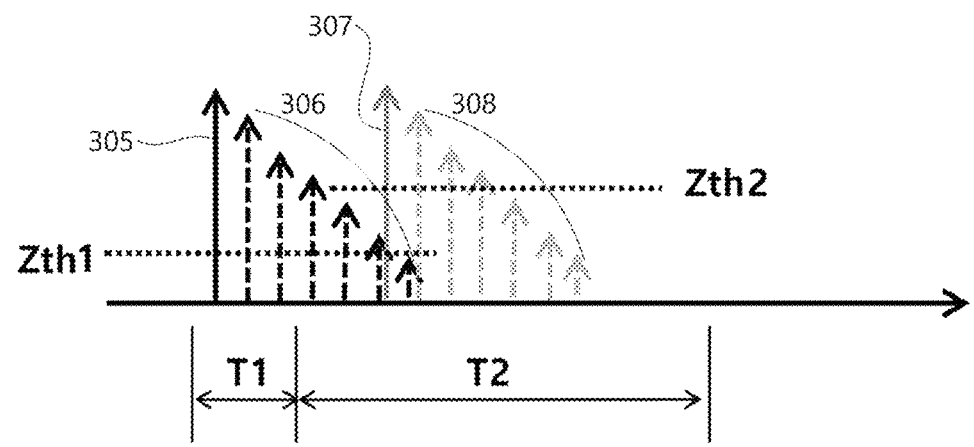

In some implementations, as illustrated in FIG. 15, in a case in which a 1st knock is input somewhat strongly, after a vibration detection signal 305 by the 1st knock and vibration detection signals 306 by residual vibrations due to the 1st knock are generated in T1, a vibration detection signal 307 exceeding Zth2 and vibration detection signals 308 of residual vibrations thereof may be generated in T2.

In some cases, the vibration detection signals 306 and 307 may overlap with each other. For example, the vibration detection signals 307 and 308 are not signals generated after T2 elapses and thus are not normal knock signals as illustrated in FIG. 14. The input of the 1st knock is strong, and thus the decreasing time of vibration by the 1st knock increases, so although only the signal of the 1st knock is actually generated, two knock signals may appear to be generated.

In some cases, when the vibration detection signal 305 of Zth1 or more is generated and, afterward, the vibration detection signal 307 of Zth2 or more is generated, the sensor microcomputer 114 may determine that there is a knock input, so to prevent this, Zth2 may be preset to be larger than Zth1.

In some implementations, Zth2 may be preset to be equal to or greater than Zth1 and may be required to consider the intensity of the 1st knock, so Zth2 may be preset to be proportional to the size of the vibration detection signal by the 1st knock. That is, Zth2 may be preset variably in proportion to the size of the vibration detection signal by the 1st knock.

Figure 16:
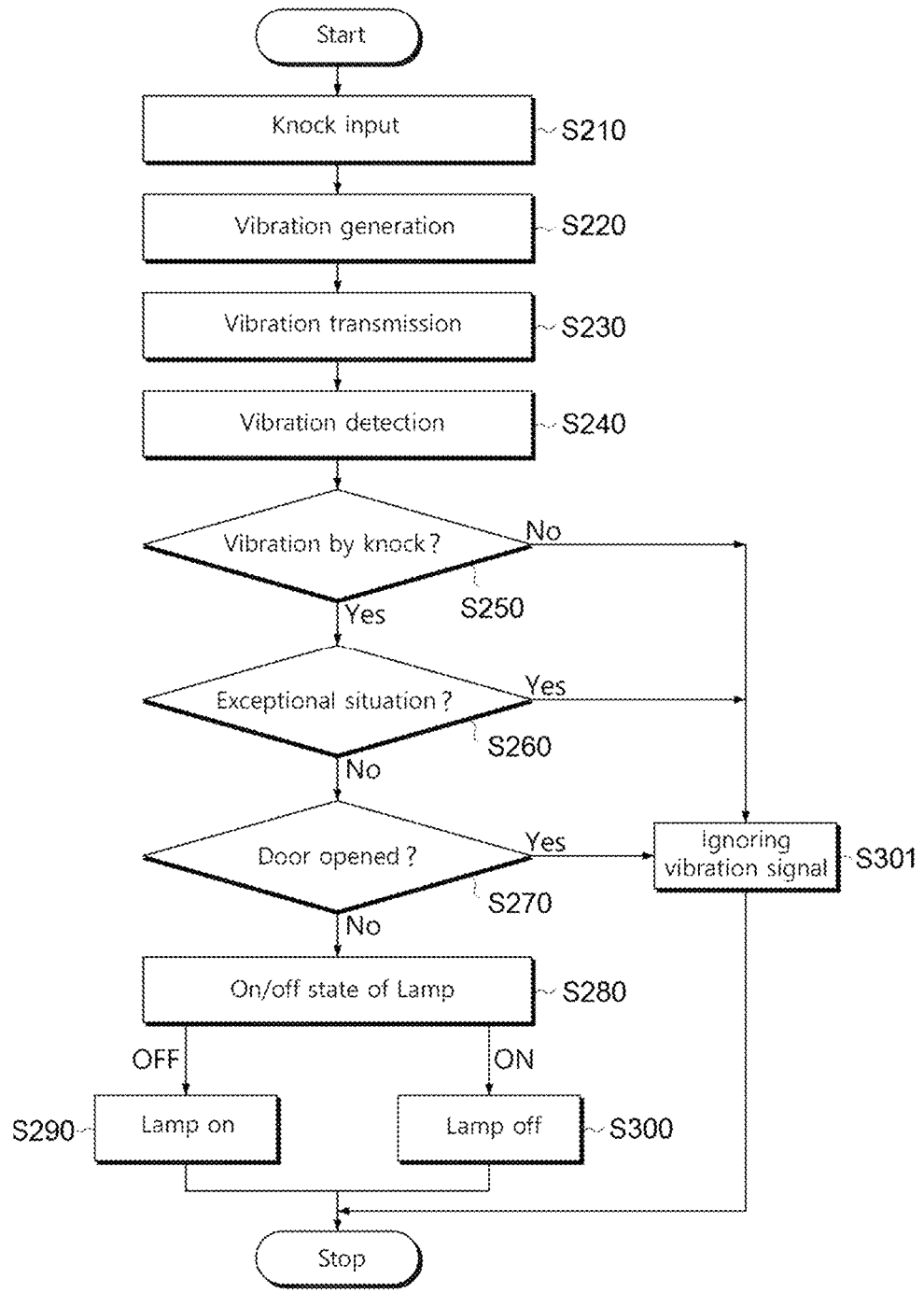
FIG. 16 is a flowchart illustrating an example of the operation of the home appliance.

Referring to FIG. 16, in some cases, a user may knock on the viewing window 21 to see the inside of the reception space 23 of the home appliance 1 from the outside through the viewing window 21 mounted to the door 20. [S210: a knock input step]

When a knock is applied to the viewing window 21, the associated position to which the knock is applied may be a vibration source and a vibration may be generated in the associated position. In some cases, the vibration generated at the associated position of the viewing window 21 may have a predetermined directionality. That is, at the associated position, the vibration may be generated in a front-to-rear direction.

In some implementations, the front-to-rear direction of the vibration is referred to as the x-axis direction of the 3-axis sensor module 111. For example, when a knock is applied to the viewing window 21, vibration may be generated in the x-axis direction. [S220: a vibration generation step]

The vibrations generated in this manner may be transmitted through a plurality of solid parts constituting the home appliance 1 to the entire portion of the home appliance 1.

In some cases, the home appliance 1 may be composed of a plurality of large and small solid parts physically coupled with each other, so when a vibration is generated at any one position of the home appliance 1, the vibration may be transmitted through the plurality of solid parts to the entirety of the home appliance 1.

In some cases, the intensity of a vibration may be attenuated to some extent depending on the connection state of solid parts and a distance in which the vibration is transmitted, but even minute vibrations may be transmitted because each of the solid parts is physically connected to each other. [S230: a vibration transmission step]

Vibrations transmitted through solid parts can be transmitted even to the sensor assembly 110 installed at a position apart from the door 20 by a predetermined distance. Accordingly, the sensor assembly 110 may detect the transmitted vibrations.

In some cases, a vibration caused by a knock applied to the viewing window 21 may be generated in the x-axis direction, and the sensor assembly 110 may detect the vibration of the x-axis direction.

Specifically, the sensor assembly 110 may include the 3-axis sensor module 111. The 3-axis sensor module 111 may detect the vibrations of three axial directions, that is, the vibrations of x, y, and z-axis directions.

For example, when the vibration of the x-axis direction generated by a knock applied to the viewing window 21 is transmitted, the 3-axis sensor module 111 may detect the vibration of the x-axis direction.

In some cases, in addition to vibration generated by a knock, vibrations of x, y, and z-axis directions generated by any cause may occur, and the 3-axis sensor module 111 may detect all these vibrations.

The 3-axis sensor module 111 may generate vibration detection signals corresponding to the detected vibrations. The vibration detection signals may be input through the filter part 112 and the amplifying part 113 to the sensor microcomputer 114.

The sensor microcomputer 114 may analyze the vibration detection signals of x, y, and z-axis directions and may determine whether a user's knock is input, that is, whether a vibration by a user's knock is generated. When it is determined that a user's knock is input, the sensor microcomputer 114 may notify the controller 150 that a user's knock is input. [S240: a vibration detection step]

When the vibration detection signals of x, y, and z-axis directions are input, the sensor microcomputer 114 may extract only the vibration detection signal of the x-axis direction. In some cases, this is intended to consider only the vibration of the x-axis direction since the direction of vibration by a knock applied to the viewing window 21 is the x-axis direction.

In some implementations, the sensor microcomputer 114 may determine that only the vibration of the x-axis direction is the vibration of a knock applied to the viewing window 21, and thus may not primarily consider vibration detection signals generated by vibrations of y and z-axis directions. Afterward, the sensor microcomputer 114 may compare the vibration detection signal of the x-axis direction with the vibration detection signals of the y and z-axis directions.

In some cases, it may be determined that there is a vibration by a knock through the detected vibration detection signal of the x-axis direction. Such determination may be performed by using the pattern of the vibration detection signal of the x-axis direction as illustrated in FIGS. 11 and 13. That is, in T1 to T5, the vibration detection signals and Zth1 to Zth3 may be compared with each other to determine whether a vibration is generated by a knock. [S250: a step of determining whether there is vibration by a knock]

When it is determined that there is vibration by a knock, it may be determined whether there is an exceptional situation in which the lamp 160 is required not to be turned on. For example, in a specific situation in which self-cleaning is performed in an oven, the lamp 160 is required not to be turned on even if a knock is input by a user. [S260: a step of determining whether there is an exceptional situation]

When it is determined that there is an exceptional situation, whether the door 20 is opened or closed may be determined. For example, when the door 20 is opened, the lamp 160 is not required to be turned on, but when the door 20 is closed, the lamp 160 is required to be turned on. Whether the door 20 is opened or closed may affect the turning on/off of the lamp 160, so whether the door 20 is opened may be determined. [S270: a step of determining whether a door is opened]

In some cases, when it is determined that there is a vibration generated by a knock and when the door 20 is closed in a state which is not an exceptional situation, whether the lamp 160 is turned on/off may be checked. [S280: a step of checking the turned on/off state of a lamp]

When the lamp 160 is turned off, the lamp 160 may be turned on. In some cases, this is intended to illuminate the reception space 23 by turning on the lamp 160 such that the inside of the reception space 23 can be seen from the outside since the inside of the reception space 23 cannot be seen from the outside in the turned-off state of the lamp 160. [S290: a step of turning on the lamp]

Contrarily, when the lamp 160 is turned on, the lamp 160 may be turned off. In some cases, this is intended to turn off the lamp 160 by a knock after a user completely checks the inside of the reception space 23. [S300: a step of turning off the lamp]

In some implementations, when it is determined that there is no vibration by a knock, there is an exceptional situation, or the door 20 is opened, a vibration detection signal may be ignored and the operation process of the home appliance may stop. [S301: a step of ignoring a vibration signal]

In some cases, in T1 to T5, vibrations by other factors as well as a vibration corresponding to a user's knock may be generated. Vibration detection signals by these vibrations generated by the other factors may be included in the vibration detection signal of the x-axis direction.

In some cases, the sensor microcomputer 114 may know that there is a vibration generated by a knock having "knocking sounds" when there is the predetermined pattern of the vibration detection signal of the x-axis direction in T1 to T5.

The first threshold $Z_{th1}$ may be preset as a fixed value, and the second and third thresholds $Z_{th2}$ and $Z_{th3}$ can be changed. These second and third thresholds $Z_{th2}$ and $Z_{th3}$ can be dynamically preset according to the size of the first threshold $Z_{th1}$. In some cases, the second and third thresholds $Z_{th2}$ and $Z_{th3}$ can be dynamically preset in proportion to the size of the vibration detection signal of the 1st knock.

In some cases, although $Z_{th1}$ has a fixed value, $Z_{th1}$ may be preset as a value different from the value of the example described above. For example, when $Z_{th1}$ is preset to have a larger value, $Z_{th2}$ and $Z_{th3}$ may be preset to have larger values in proportion to the value of $Z_{th1}$.

In some cases, $Z_{th2}$ is preferably preset to be equal to or larger than $Z_{th1}$. $Z_{th1}$ is a threshold for determining whether there is a 1st knock, and $Z_{th2}$ is a threshold for determining whether there is a 2nd knock. Accordingly, in order to exclude a case in which the 1st knock is input strongly, and a vibration generated by the 1st knock is misdetected as a vibration generated by the 2nd knock's input, the value of $Z_{th2}$ can be preset to be greater such that the standard of determination for the 2nd knock is further raised. Accordingly, a more accurate determination for the 2nd knock may be performed.

In some implementations, even if the pattern of the vibration detection signal appears in the same manner even in the y or z-axis direction, the sensor microcomputer 114 may not determine that there is a vibration generated by a knock. This is because a vibration caused by a knock applied to the viewing window 21 has only the direction of the x-axis. However, the vibration of the x-axis direction may be affected by vibrations of the y and z-axis directions and thus the vibrations of the y and z-axis directions may be misdetected as the vibration by the knock. Therefore, the vibration detection signal of the x-axis direction may be compared with the vibration detection signals of the y and z-axis directions.

In some cases, even if vibration detection signals having sizes of $Z_{th1}$ or $Z_{th2}$ or more are continuously generated at predetermined intervals in T1 to T4, the patterns of the vibration detection signals may be compared with the pattern of a vibration by a knock to determine whether there is a knock input.

Figure 17:
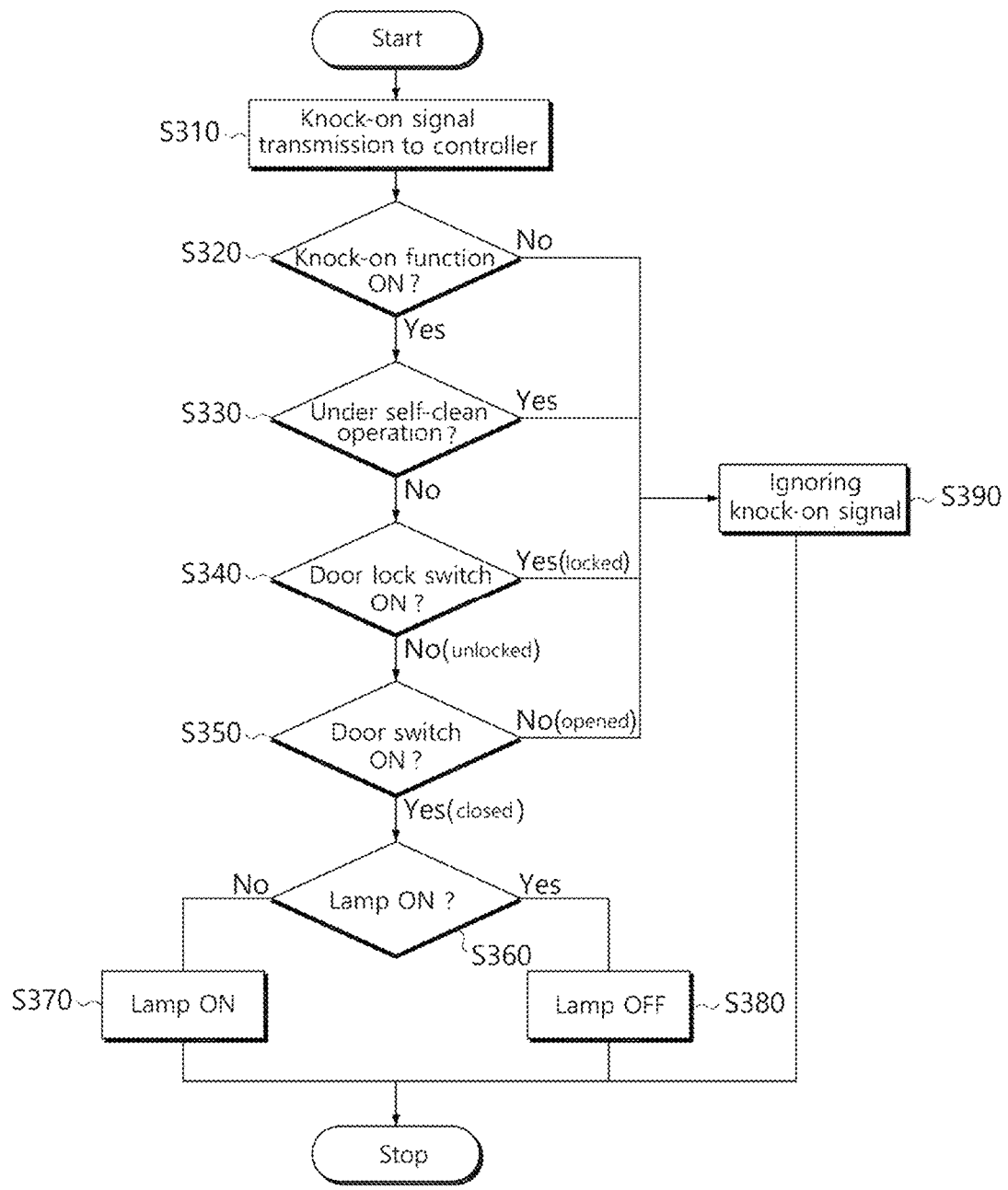
FIG. 17 is a flowchart illustrating an example of the operation of the home appliance.

Referring to FIG. 17, in some implementations, when a user knocks on the door 20, the sensor assembly 110 may detect a vibration generated by the knock. When the sensor assembly 110 detects the vibration caused by the user's knock, the sensor assembly 110 may transmit a knock-on signal to the controller 150. [S310: a step of transmitting a knock-on signal]

When the controller 150 receives the knock-on signal from the sensor assembly 110, the controller 150 may determine whether the knock-on function is preset to be turned on. The knock-on function is a function of turning on/off the lamp 160 by a user's knock.

In some cases, a knock-on function may be preset by touching the knock-on button 51 displayed on the display part 50. When the knock-on button 51 is touched, the knock-on function may be preset to be turned on, and when the knock-on button 51 is touched once more, the knock-on function may be preset to be turned off.

When the knock-on function is preset to be turned on, the lamp 160 may be turned on/off by a user's knock, but when the knock-on function is preset to be turned off, the lamp 160 may not be turned on/off by a user's knock. In some cases, in the state in which the knock-on function is turned off, the on/off function of the lamp 160 may not be performed even if a user's knock is applied.

Accordingly, when the knock-on signal is transmitted to the controller 150, the controller 150 may first check whether the knock-on function is preset to be turned on before turning on/off the lamp 160. [S320: a step of determining the presetting of the knock-on function]

In some cases, when the knock-on function is preset to be turned on, it may be determined whether the present state of the home appliance 1 is under a self-clean operation. The self-clean function refers to performing a self-cleaning process such as disinfecting and cleaning the reception space 23 of the home appliance 1.

For example, in a case in which the home appliance 1 is an oven, a cooking compartment which is the reception space 23 may be cleaned with high heat. In some cases, the inside of the cooking compartment can be in a very high temperature state, and it can be preferable that the door 20 is locked. Furthermore, while the reception space 23 is under a self-clean operation, the lamp 160 installed in the reception space 23 preferably does not operate.

In some implementations, in the state in which the knock-on signal is transmitted to the controller 150 and the knock-on function is preset to be turned on, the controller 150 is required to check whether the home appliance is under the self-clean operation before turning on/off the lamp 160. [S330: a step of checking whether self-clean operation is underway]

In some cases, when the knock-on function is preset to be turned on and the self-clean operation is not underway, it may be determined whether the door lock switch 120 is turned on. The door lock switch 120 may lock or unlock the door 20 in a specific situation.

For example, after self-cleaning the cooking compartment by high heat, the door 20 may be maintained to be locked for safety of a user while the temperature of the inside of the cooking compartment decreases to a predetermined temperature or less.

In some cases, the controller 150 may control the door lock switch 120 to lock the door 20. Accordingly, after the self-clean operation, the knock-on function may not be operated for a predetermined period of time.

In some cases, when the knock-on signal is input, the controller 150 may determine the state of the door lock switch 120, that is, whether the door is locked or unlocked before turning on/off the lamp 160. [S340: a step of determining whether the door lock switch is turned on]

In some cases, when the door 20 is unlocked, the controller 150 may determine whether the door 20 is opened or closed by using the signal of the door switch 130.

For example, when the door 20 is opened, the lamp 160 is not required to be turned on. The lamp 160 is required to be turned on only when the door 20 is closed.

In some cases, whether the door 20 is opened or closed may affect the turning on/off of the lamp 160, so the controller 150 may determine whether the door 20 is opened. Whether the door 20 is opened or closed can be determined by a signal transmitted by the door switch 130. [S350: a step of determining whether the door is opened or closed]

In some cases, when the door 20 is closed, the turned on/off state of the lamp 160 may be checked to determine whether to turn on/off the lamp 160. [S360: a step of checking the turned on/off state of the lamp]

When the lamp 160 is turned off, the lamp 160 may be turned on. In some cases, this is intended to illuminate the reception space 23 by turning on the lamp 160 such that the inside of the reception space 23 can be seen from the outside because the inside of the reception space 23 cannot be seen from the outside when the lamp 160 is turned off. [S370: a step of turning on the lamp]

Contrarily, when the lamp 160 is turned on, the lamp 160 may be turned off. In some cases, this is intended to turn off the lamp 160 by a knock after a user completely checks the inside of the reception space 23. [S380: a step of turning off the lamp]

Meanwhile, in a state in which the controller 150 receives the knock-on signal, when the knock-on function is preset to be turned off, the self-clean operation is underway, the door is locked, or the door is opened, the controller 150 may ignore the received knock-on signal.

In some cases, this is intended to not turn on/off the lamp 160 even if a user's knock is input in some exceptional situations described above. [S390: a step of ignoring a knock-on signal]

In some implementations, when the knock-on function is turned off, the self-clean operation is underway, the door is locked, and the door is opened as described above, the lamp 160 may not be turned on/off even if a knock is input.

Figure 18:
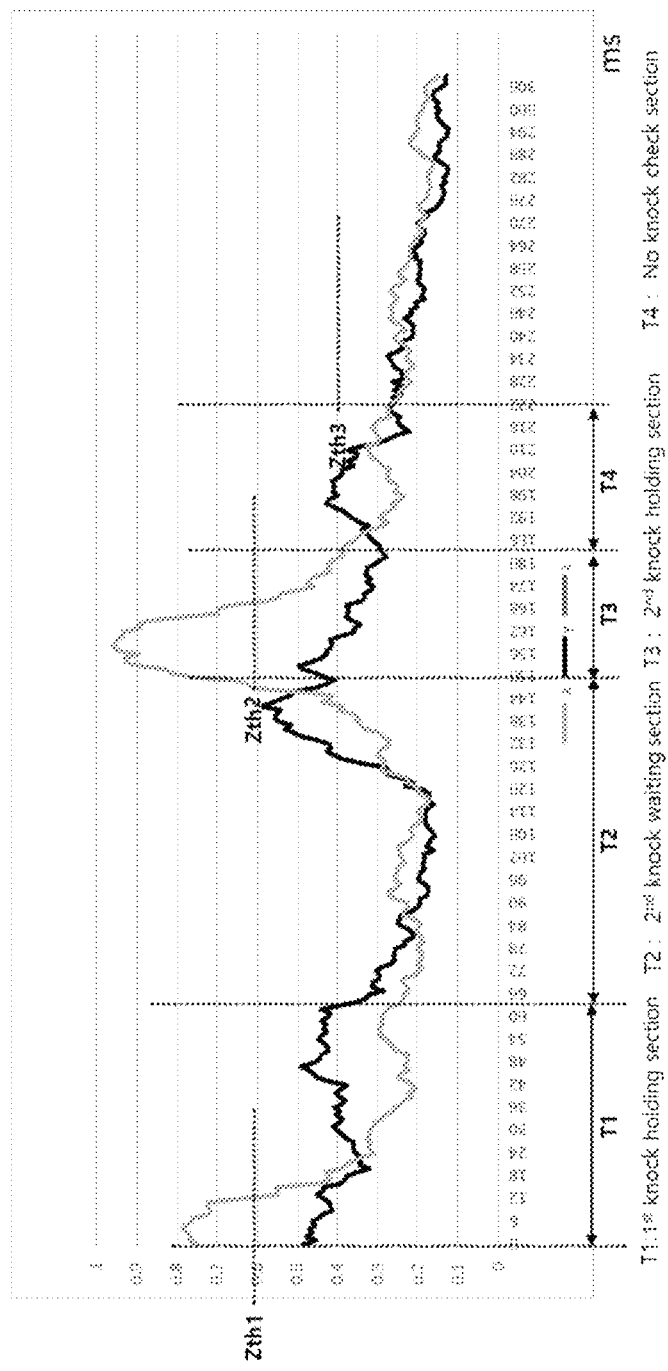
FIG. 18 is a graph illustrating an example of the experimental result of the vibration detection signal for describing knock input detection in the home appliance.
Figure 19:
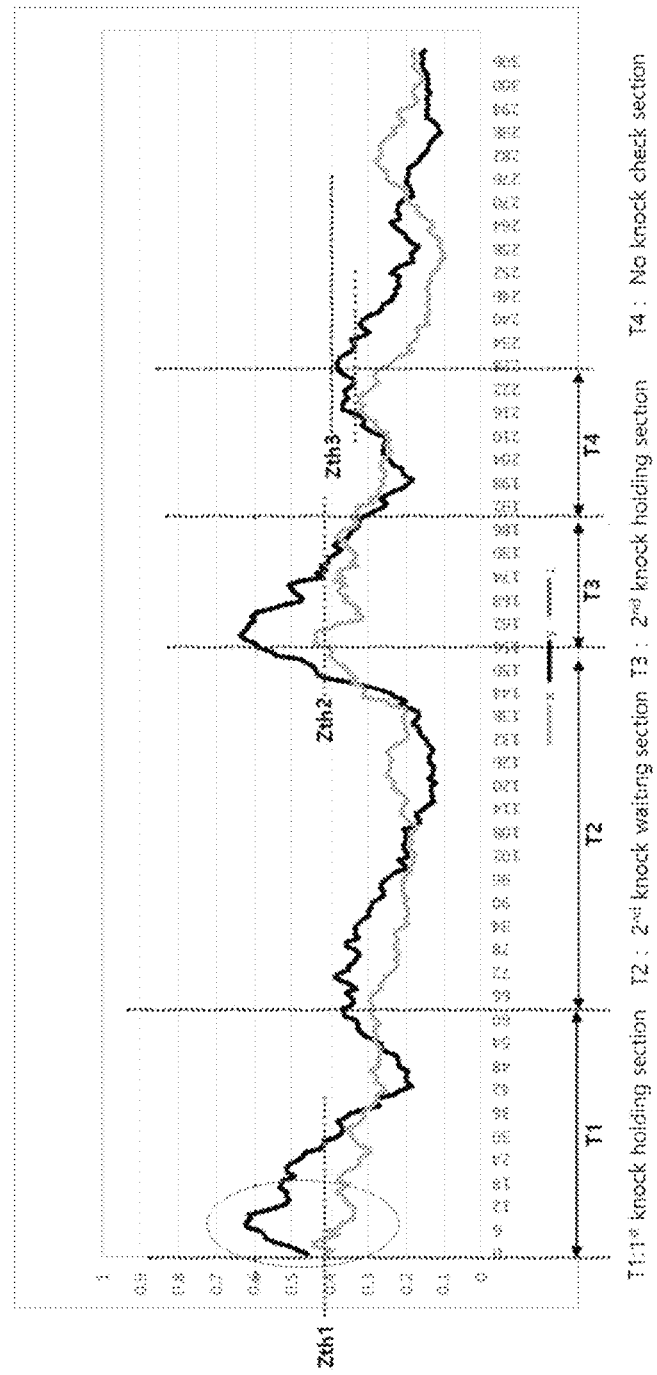
FIGS. 19 and 20 are graphs illustrating an example of the experimental results of the vibration detection signal for describing no detection of a knock input in the home appliance.
Figure 20:
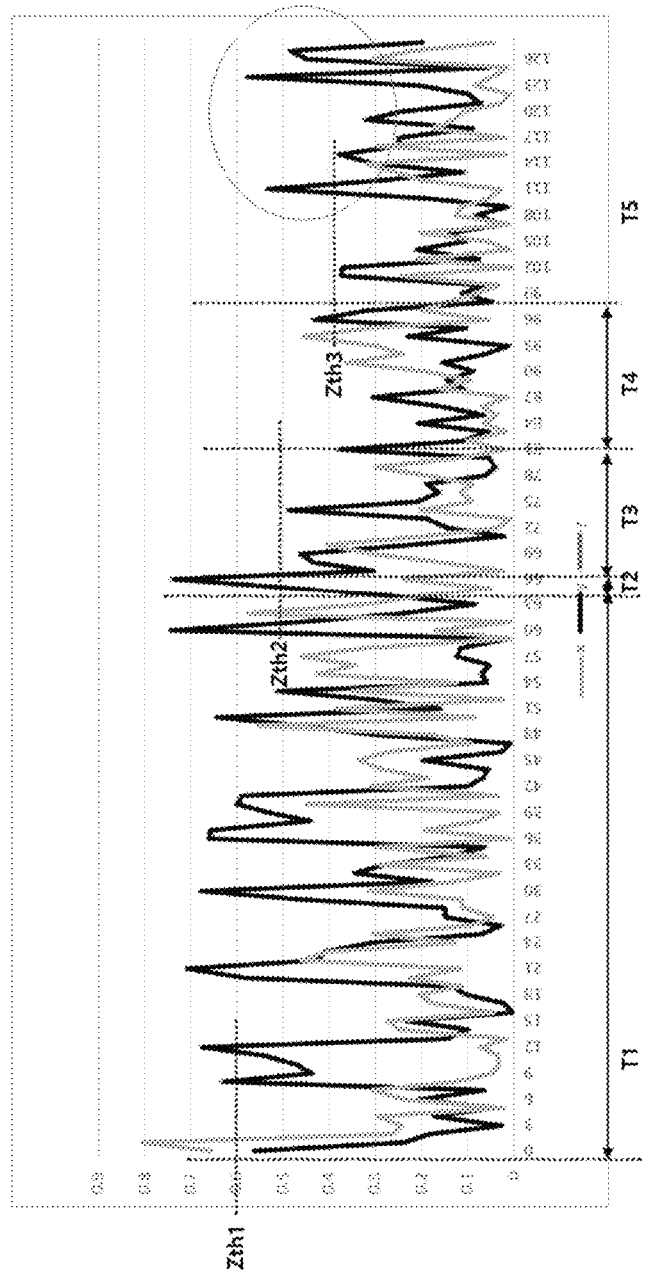
Figures 22A, 22B:
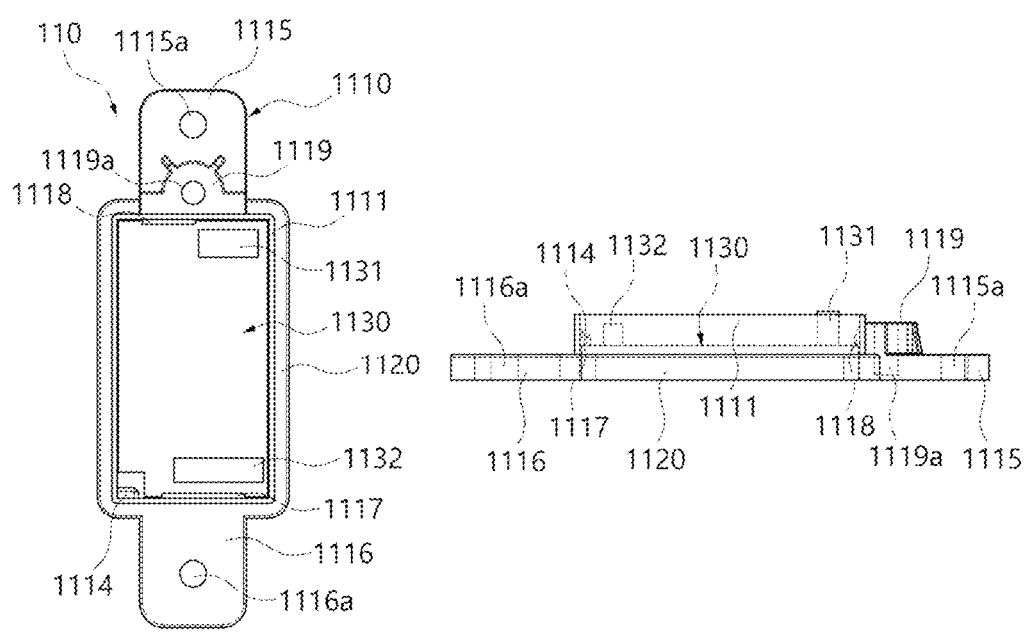

FIG. 18 is a graph illustrating an example of an experimental result of vibration detection signals for describing knock input detection in a home appliance, and FIGS. 19 and 20 are graphs illustrating an example of the experimental results of vibration detection signals for describing no detection of a knock input in the home appliance. In FIGS. 18 to 20, the experimental results in which the vibration detection signals are detected only on the x and y axes are illustrated.

In some cases, referring to FIG. 18, for vibration detection signals of an x-axis direction, a vibration detection signal of the first threshold Zth1 or more is generated in T1, a vibration detection signal of the second threshold Zth2 or more is generated in T3 after the waiting period of time of T2, and a vibration detection signal of the third threshold Zth3 or less is generated in T5, so the sensor microcomputer 114 may determine that the patterns are the patterns of vibration detection signals generated by a knock.

In some cases, the vibration detection signal in T1 is generated by the 1st knock, and the vibration detection signal in T3 is generated by the 2nd knock. In the experiment of FIG. 18, the 1st knock is not input strongly, so Zth1 and Zth2 are preset to have the same values.

Accordingly, the sensor microcomputer 114 may detect that a knock is applied to the viewing window 21 and may transmit a knock-on signal to the controller 150, and thus the controller 150 may turn on or off the lamp 160.

In some cases, referring to FIG. 19, for vibration detection signals of an x-axis direction, a vibration detection signal of Zth1 or more is generated in T1, afterward a vibration detection signal of Zth2 or more is generated in T3 after T2. However, in T1 and T3, the maximum value of the vibration detection signal of a y-axis direction is larger than the maximum value of the vibration detection signals of the x-axis direction, so although the vibration detection signals of the x-axis direction are generated to have the patterns of the vibration detection signals by a knock, the experimental result of FIG. 19 is that no vibration by a knock is detected. The reason is that the vibration of the y-axis direction is misdetected as the vibration of the x-axis direction.

In some cases, the sensor microcomputer 114 may detect that there is no vibration detection signal by a knock and may not output a knock-on signal to the controller 150. The controller 150 may not output a control signal to the lamp 160.

In some cases, referring to FIG. 20, for vibration detection signals of an x-axis direction, a vibration detection signal of Zth1 or more is generated in T1, afterward a vibration detection signal of Zth2 or more is generated in T3 after T2, but a vibration detection signal larger than Zth3 is generated in T5. Accordingly, although the vibration detection signals of an x-axis direction are generated to have the patterns of vibration detection signals by a knock, the experimental result of FIG. 20 is that no vibration by a knock is detected.

That is, although T5 is a section in which a vibration (indicated by a circle) by the 2nd knock disappears, a vibration is continuously generating, so it may not be determined that a vibration by a knock is generated.

In some cases, the sensor microcomputer 114 may detect that there is no vibration detection signal by a knock, and may not output a knock-on signal to the controller 150. The controller 150 may not output a control signal to the lamp 160.

In some implementations, a home appliance can comprise a viewing window that is mounted on the door of the front surface of the home appliance, and wherein when a knock is applied to the viewing window, a vibration by the knock is detected, and the lamp installed in the reception space defined inside the home appliance is turned on to illuminate the inside of the reception space such that the inside of the reception space can be seen from the outside through the viewing window.

In some cases, when a knock is applied to the viewing window, a vibration may be generated in a specific direction due to the knock, and the sensor assembly may detect a vibration detection signal corresponding to the vibration of such a specific direction and may compare the vibration detection signal with the pattern of a vibration detection signal due to the knock to determine whether the knock is input.

Particularly, a vibration by a knock may be generated in a specific direction, and thus vibrations generated in other directions may not be considered. For example, when the direction of a vibration by a factor is different from the direction of a vibration by a knock even if the pattern of a vibration detection signal by the factor is the same as the pattern of a vibration detection signal by the knock, the vibration by the factor may be ignored.

In some implementations, in order to accurately detect the directionality of vibrations and minute vibrations, the 3-axis acceleration sensor may be used. In some cases, the sensor microcomputer can determine whether there is a vibration generated by a knock by applying vibration detection signals detected by the 3-axis acceleration sensor to the patterns of T1 to T5.

When it is determined that there is a vibration generated by the knock, the controller 150 may turn on/off the lamp 160. When a knock is input in the turned-off state of the lamp 160, the controller 150 may turn on the lamp 160, and contrarily, when a knock is input in the turned-on state of the lamp 160, the controller 150 may turn may turn off the lamp 160.

FIGS. 21A through 24 are views illustrating an example of a configuration of the sensor assembly.

In some implementations, a housing 1110 constituting the sensor assembly 110 may be provided with a base 1120 having a rectangular shape as a whole. An edge plate 1111 having a periphery of a predetermined height may be disposed at the upper portion of the base 1120. The housing 1110 may have a space 1112 defined therein by the edge plate 1111. Such a space 1112 may be open on one surface thereof.

In some cases, a PCB substrate 1130 may be disposed at the bottom surface 1113 of the space 1112 defined by the edge plate 1111. In some cases, multiple electronic elements can be mounted on the PCB substrate 1130. For example, the 3-axis sensor module 111, the filter part 112, the amplifying part 113, and the sensor microcomputer 114 can be mounted on the PCB substrate 1130.

In some cases, at least one connector 1131 or 1132 can be mounted to the PCB substrate 1130 such that the PCB substrate is electrically connected to an external device. In order to protect the PCB substrate 1130 from an external environment, with the PCB substrate 1130 being mounted to the bottom of the space 1112, the height of the PCB substrate 1130 can be preferably smaller than the height of the edge plate 1111.

The PCB substrate 1130 may be stably mounted inside the housing 1110, and at least one hook 1117 or 1118 can be provided on the inner surface of the edge plate 1111 such that PCB substrate 1130 can be stably fastened to the housing 1110.

Such a hook 1117 or 1118 can be configured to fasten an end part of the substrate 1130 to the hook 1117 or 1118 in a state in which the substrate 1130 is disposed at the bottom surface 1113. In some cases, the end part can be configured to be inserted into a position between the bottom surface 1113 and the hook 1117 or 1118.

In some cases, the PCB substrate 1130 may be forcibly pressed from an upper side thereof such that the end part of the substrate 1130 passes the hook 1117 or 1118 to be fastened to the lower part of the hook 1117 or 1118.

Holes 1117a and 1118a may be defined respectively in positions of the bottom surface 1113 corresponding to the hooks 1117 and 1118. Each of the holes 1117a and 1118a can be in a state in which the PCB substrate 1130 is mounted to the housing 1110 and is fastened by the hook 1117 or 1118, the substrate 1130 is pushed from the rear surface of the substrate 1130 through the holes 1117a and 1118a of the lower side of the substrate 1130 such that the substrate 1130 can easily be removed from the housing 1110.

The base 1120 can have extension parts 1115 and 1116 extending respectively to the upper and lower sides of the base. Accordingly, the extension parts 1115 and 1116 can respectively have holes 1115a and 1115b formed therein.

Figure 24:
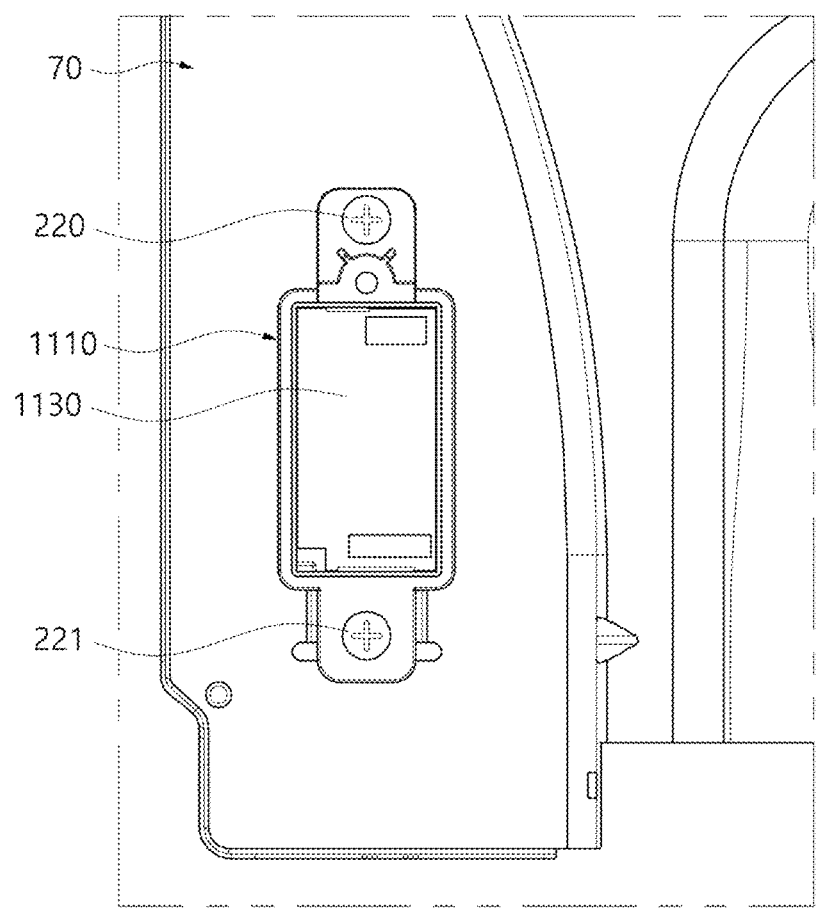
Figure 25:
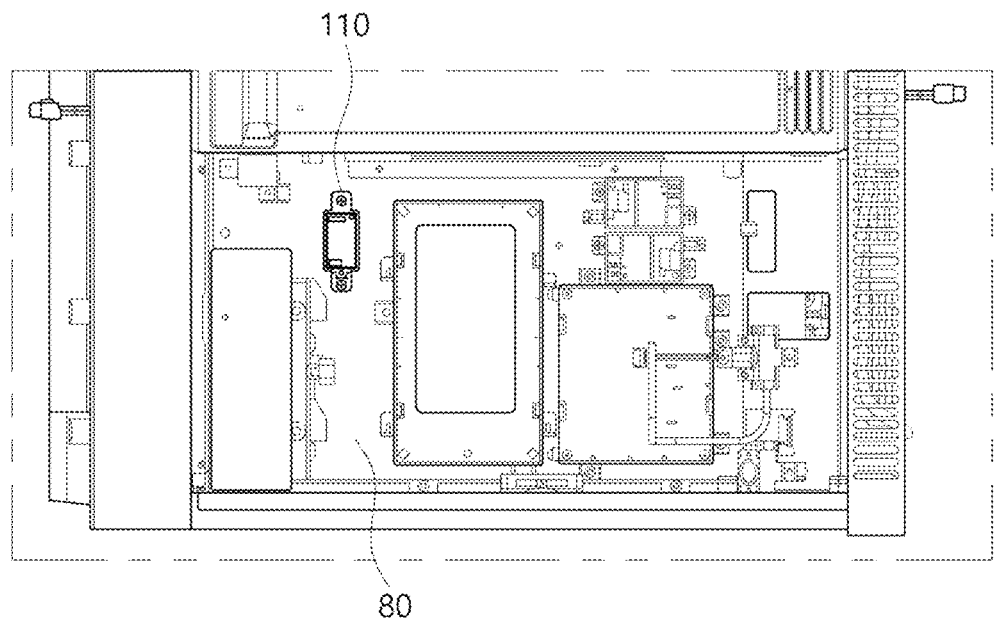
FIGS. 25 to 30 are views illustrating examples in which the sensor assembly is mounted to the home appliance.
Figure 26:
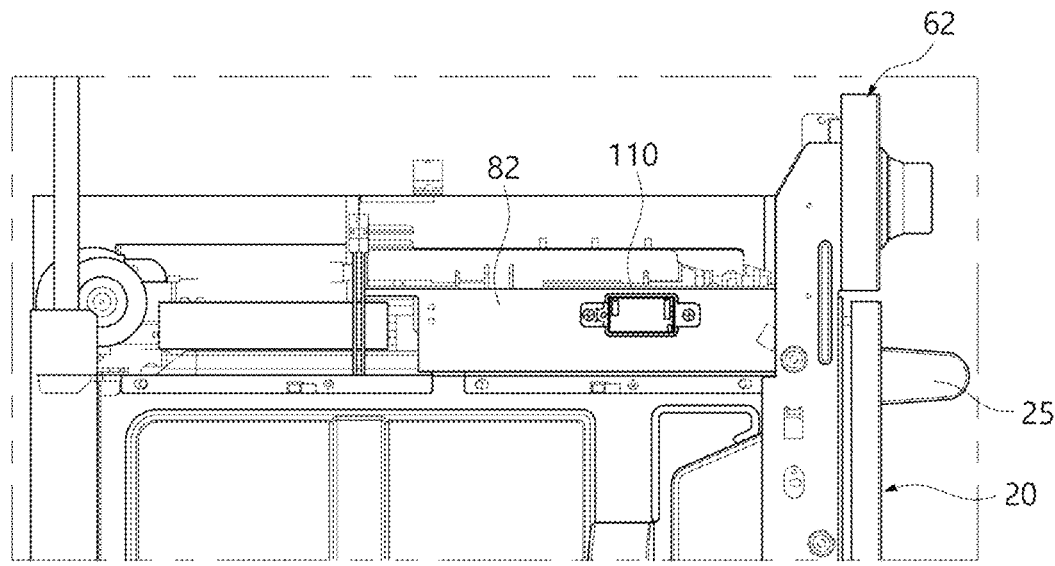
Figure 27:
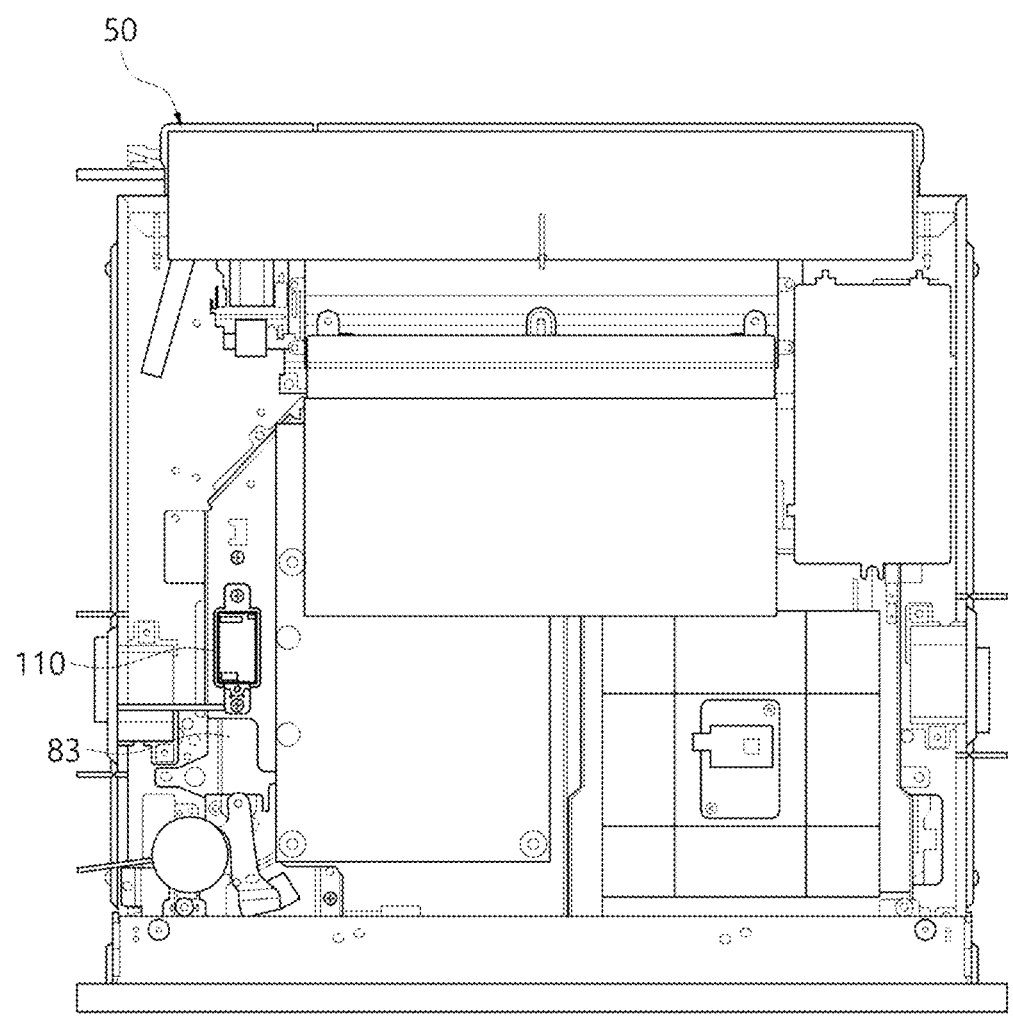
Figure 28:
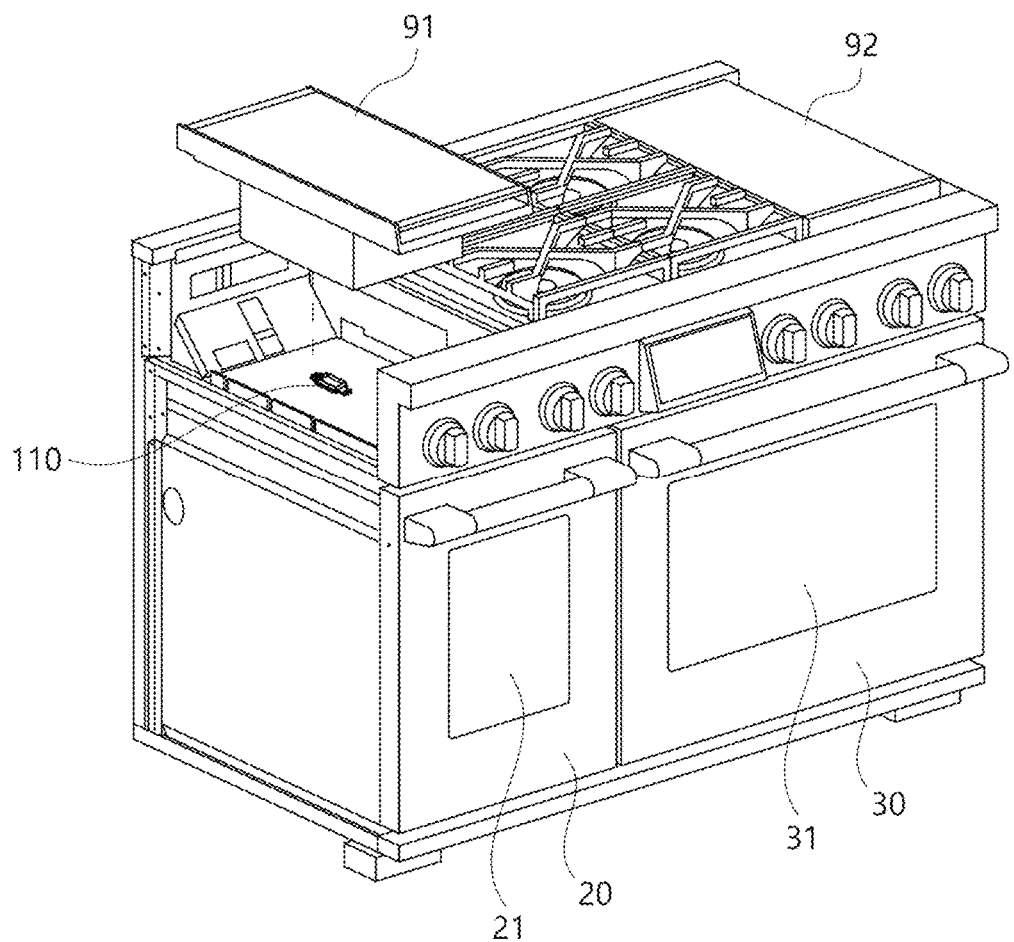
Figure 29:
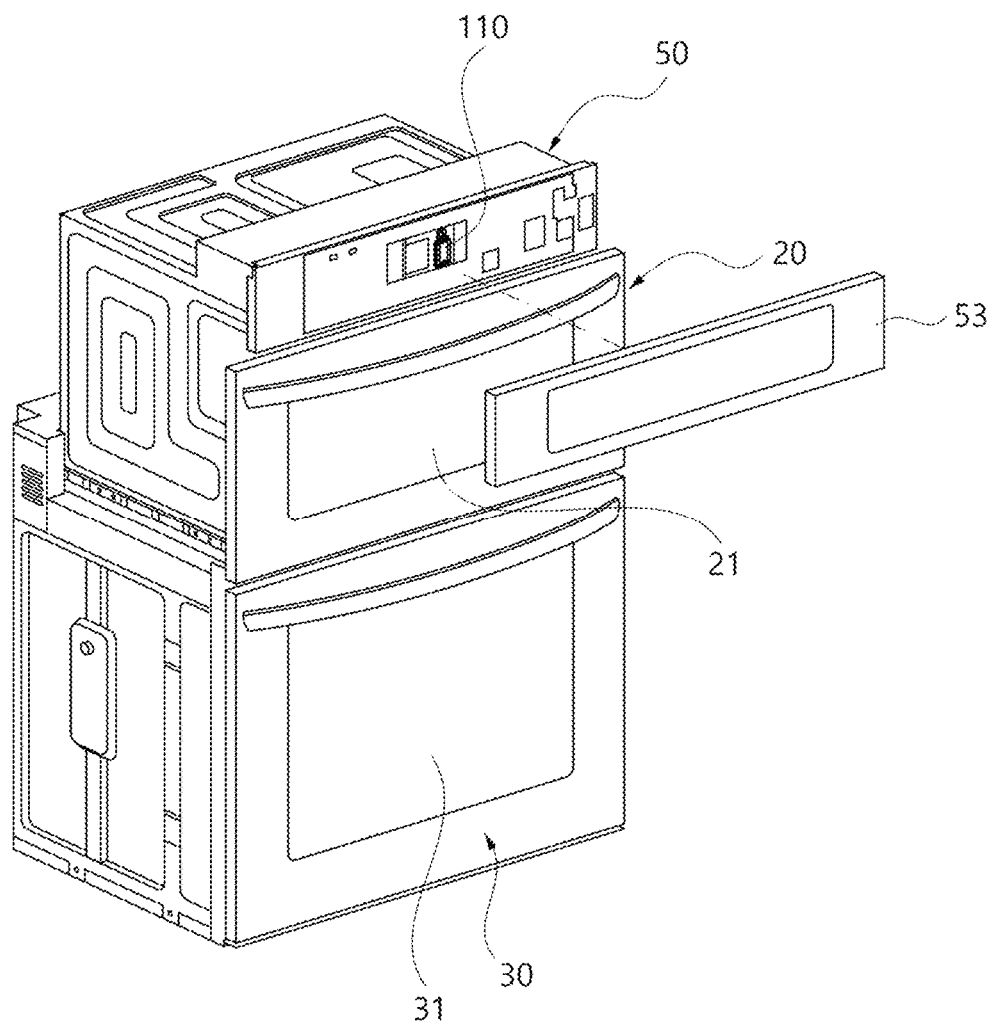
Figure 30:
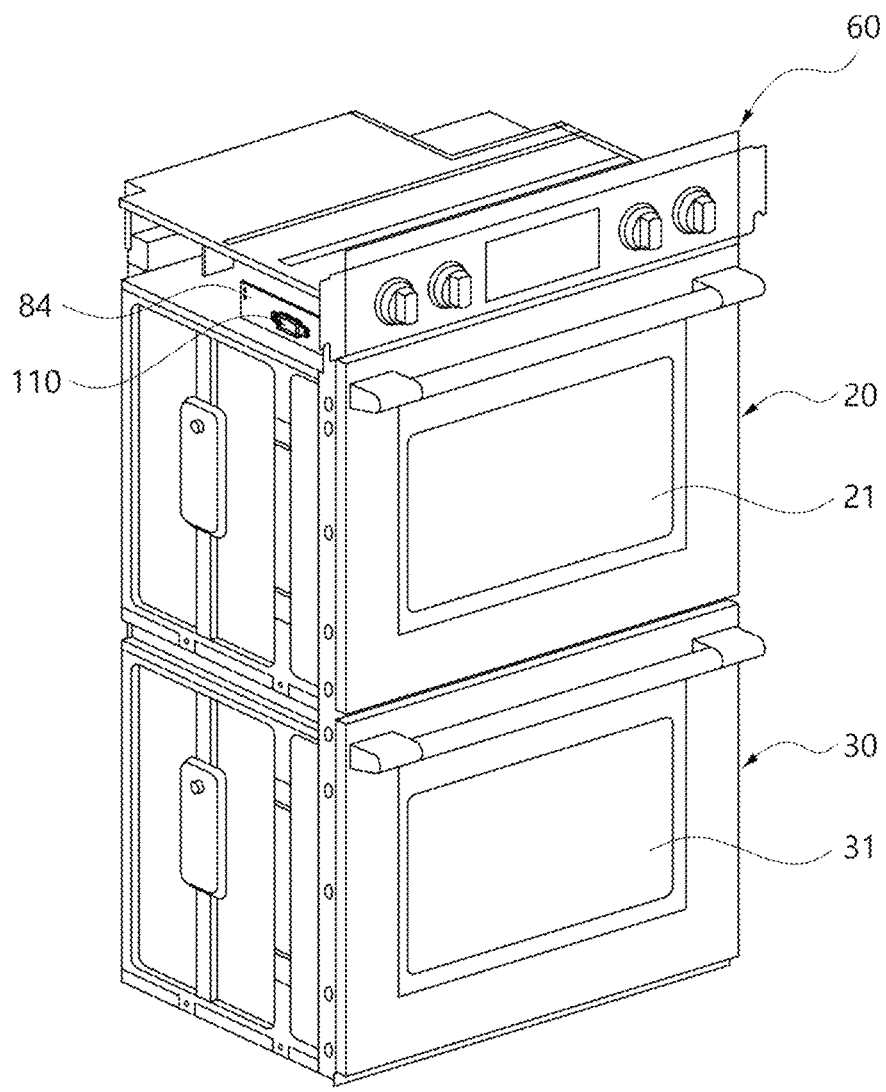

In some implementations, as illustrated in FIG. 24, these holes 1115a and 1115b are intended to insert screws 220 and 221 thereto such that the sensor assembly 110 can be fastened to a specific part 70 of the home appliance 1. In some cases, the specific part 70 can be a PCB substrate 70.

Figure 23B:
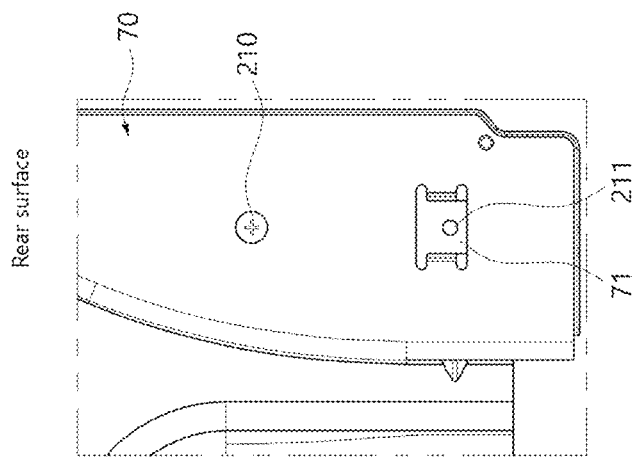
Figure 23A:
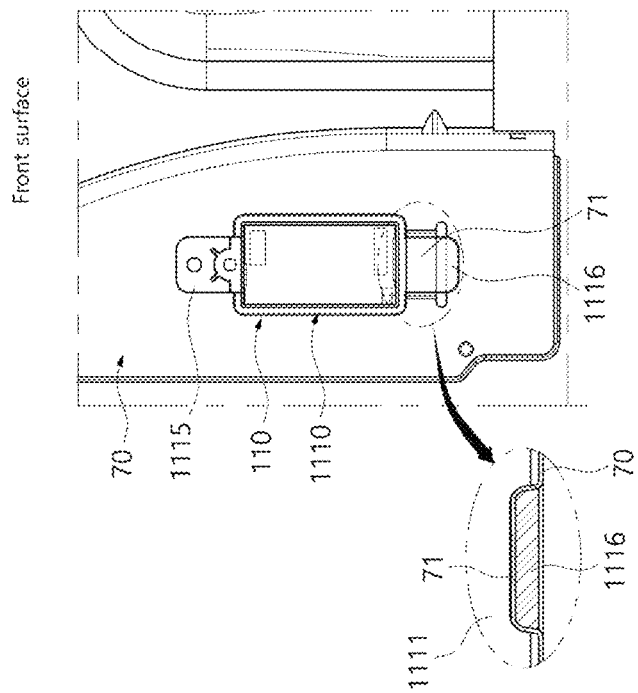

In some implementations, as illustrated in FIGS. 23A and 23B, when mounting the sensor assembly 110 to the specific part 70 of the home appliance 1, a lower extension part 1116 of the extension parts can be a part inserted into a slit 71 formed in the associated part 70. The lower extension part 1116 may be inserted into the slit 71 so as to mount the sensor assembly 110 to the associated part 70 of the home appliance 1.

A protruding part 1119 may be disposed at the upper surface of an upper extension part 1115 such that the protruding part 1119 is coupled to the edge plate 1111. The protruding part 1119 can have a hole 1119a defined therein. A screw can be inserted into the associated hole 1119a such that the sensor assembly 110 is fastened to the associated part 70.

In some implementations, as illustrated in FIGS. 23A and 23B, the lower extension part 1116 can be inserted into the slit 71 to be fastened thereto, and the protruding part 1119 can be fastened to the upper extension part 1115 by a screw 210 passing through the hole 1119a defined in the protruding part 1119. In this case, for example, the screw 210 may be fastened to the associated part 70 from a rear surface thereof such that the sensor assembly 110 can be fastened to the part 70.

FIGS. 25 to 30 illustrate examples in which the sensor assembly is mounted to the home appliance. As illustrated in these drawing, the sensor assembly 110 may be installed on any parts constituting the home appliance 1.

In some cases, the sensor assembly 110 can be installed such that the direction of an axis of any one of the acceleration sensors of the 3-axis sensor module 111 constituting the sensor assembly 110 coincides with the direction of a vibration generated by a knock. The sensor assembly 110 can be configured as a module and thus the installation and attachment/detachment of the sensor assembly 110 can be easily performed.

The home appliance 1 can have various shapes, and regardless of the shape of the home appliance 1, the sensor assembly 110 can be installed even in any positions 81 to 83 of the home appliance 1.

Although the implementations of the present disclosure have been described with reference to the accompanying drawings, the present disclosure is not limited to the above implementations and may be provided in various different forms. Those skilled in the art will be able to understand that the present disclosure may be embodied in other specific forms without changing the technical idea or essential characteristics of the present disclosure.

The invention claimed is:
1. An oven comprising:
a reception space configured to receive objects therein;
a heater configured to heat the reception space;
a door configured to open/close an open surface of the reception space, the door having a viewing window provided at the door;
a lamp configured to illuminate an inside of the reception space;
a sensor assembly configured to output a knock-on signal based on detecting a user's knock; and
a controller configured to turn on/off the lamp based on the knock-on signal output by the sensor assembly,
wherein based on a present state of the oven corresponding to at least any one of a plurality of preset excep- tional situations, the controller is configured to not turn on/off the lamp regardless of the knock-on signal being output.

2. The oven of claim 1, wherein based on the door of the oven being opened, the controller is configured to not turn on/off the lamp regardless of the knock-on signal being output.

3. The oven of claim 1, wherein based on the oven being in a self-clean operation, the controller is configured to not turn on/off the lamp regardless of the knock-on signal being output.

4. The oven of claim 1, wherein based on the door of the oven being locked, the controller is configured to not turn on/off the lamp regardless of the knock-on signal being output.

5. The oven of claim 1, wherein based on the lamp being turned on by a user touching a lamp button, the controller is configured to not turn on/off the lamp regardless of the knock-on signal being output.

6. The oven of claim 1, wherein based on a knock-on function being preset to be turned off by a user touching a knock-on button, the controller is configured to not turn on/off the lamp regardless of the knock-on signal being output.

7. The oven of claim 1, wherein based on the lamp blinking after pre-heating of the oven is completed, the controller is configured to not turn on/off the lamp regardless of the knock-on signal being output.

8. The oven of claim 1, wherein the controller is configured to determine whether the door is locked through a door lock switch.

9. The oven of claim 8, wherein the door lock switch is configured to transmit information on whether the door is locked to the controller and lock/unlock the door according to a control signal output from the controller.

10. An oven comprising:
a reception space configured to receive objects therein;
a heater configured to heat the reception space;
a door configured to open/close an open surface of the reception space, the door having a viewing window provided at the door;
a lamp configured to illuminate an inside of the reception space;
a sensor assembly configured to output a knock-on signal based on detecting a user's knock;
a display part disposed at an outer surface of the oven and configured to display a plurality of buttons; and
a controller configured to turn on/off the lamp based on a touch signal of each of the buttons and the knock-on signal output by the sensor assembly,
wherein based on at least one of the plurality of buttons displayed on the display part being touched, the controller is configured to not turn on/off the lamp regardless of the knock-on signal being output.

11. The oven of claim 10, wherein a knock-on button configured to turn on/off a knock-on function based on a user's touch is displayed on the display part, and based on the knock-on button being touched and the knock-on function being preset to be turned off, the controller is configured to not turn on/off the lamp regardless of the knock-on signal being output.

12. The oven of claim 10, wherein a lamp button configured to turn on/off the lamp based on a user's touch is displayed on the display part, and based on the lamp button being touched and the lamp being turned on, the controller is configured to not turn on/off the lamp regardless of the knock-on signal being output.

13. A control method for an oven, the method comprising:
outputting a knock-on signal based on a vibration generated by a user's knock applied to the oven being detected;
determining whether a knock-on function is preset to be turned on by touching a knock-on button based on the knock-on signal being output;
determining whether the oven is in a self-clean operation based on the knock-on function being preset to be turned on;
determining whether a door of the oven is locked based on the oven not being in the self-clean operation;
determining whether the door is closed based on the door not being locked; and
determining whether to turn on/off a lamp installed inside a reception space of the oven based on the door being closed.

14. The method of claim 13, wherein in the determining of whether to turn on/off the lamp, based on the lamp being in a turned-on state, the lamp is turned off, but based on the lamp being in a turned-off state, the lamp is turned on.

15. The method of claim 13, wherein based on it being determined that the oven is in at least one of a state in which the knock-on function is preset to be turned off, a state in which the oven is in the self-clean operation, a state in which the door is locked, and a state in which the door is opened, the knock-on signal is ignored and the lamp is not turned on/off.

16. The method of claim 13, further comprising:
determining whether the lamp is turned on by a user touching a lamp button before the determining of whether to turn on/off the lamp,
wherein in the determining of whether to turn on/off the lamp, based on the lamp being turned on by the lamp button touched by a user, the lamp is not turned on/off.

* * * * *